US012664949B2

(12) United States Patent
Wang et al.

(10) Patent No.: US 12,664,949 B2
(45) **Date of Patent: *Jun. 23, 2026**

(54) DUAL-MEMORY DRIVING OF AN ELECTRONIC DISPLAY

(71) Applicant: Apple Inc., Cupertino, CA (US)

(72) Inventors: Bilin Wang, San Jose, CA (US); Tien-Chien Kuo, Sunnyvale, CA (US); Kanghoon Jeon, San Jose, CA (US); Chun-Yao Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/978,711

(22) Filed: Dec. 12, 2024

(65) Prior Publication Data

US 2025/0111830 A1 Apr. 3, 2025

Related U.S. Application Data

(63) Continuation of application No. 17/949,949, filed on Sep. 21, 2022, now Pat. No. 12,175,943, which is a (Continued)

(51) Int. Cl.
*G09G 3/3291* (2016.01)
*G09G 3/36* (2006.01)
*G09G 5/397* (2006.01)

(52) U.S. Cl.
CPC ......... *G09G 3/3291* (2013.01); *G09G 3/3688* (2013.01); *G09G 5/397* (2013.01); *G09G 2310/027* (2013.01)

(58) Field of Classification Search
CPC .... G09G 3/3291; G09G 3/3688; G09G 5/397; G09G 2310/027
See application file for complete search history.

(56) References Cited

U.S. PATENT DOCUMENTS 4,769,713 A 9/1988 Yasui
5,847,701 A * 12/1998 Eglit ...................... G09G 5/006 345/204

(Continued)

FOREIGN PATENT DOCUMENTS

CN 1475985 A 2/2004
JP H11-231835 A 8/1999

(Continued)

OTHER PUBLICATIONS

Office Action for Chinese Patent Application No. 202180018871.4 dated Dec. 31, 2024; 10 pgs.

(Continued)

*Primary Examiner* — Ke Xiao
(74) *Attorney, Agent, or Firm* — Fletcher Yoder, P.C.

(57) ABSTRACT

A display system may include a memory external to a pixel that stores a first digital data value, a memory internal to the pixel that stores a second digital data signal, where a combination of the first digital data signal and the second digital data signal may indicate a target gray level assigned to the pixel for a particular image frame. The pixel may be driven for a first duration of time according to the first digital data signal and for a second duration of time according to the second digital data signal.

20 Claims, 21 Drawing Sheets

Related U.S. Application Data continuation of application No. 17/196,759, filed on Mar. 9, 2021, now Pat. No. 11,527,209.

(60) Provisional application No. 63/003,039, filed on Mar. 31, 2020.

(56) References Cited

U.S. PATENT DOCUMENTS

| | | | | |
|---|---|---|---|---|
| 5,987,624 | A * | 11/1999 | Eglit | G09G 5/006 714/32 |
| 7,106,351 | B2 | 9/2006 | Ito | |
| 7,113,195 | B2 | 9/2006 | Willis et al. | |
| 7,738,001 | B2 | 6/2010 | Routley et al. | |
| 8,013,820 | B2 | 9/2011 | Goetz et al. | |
| 8,237,756 | B2 | 8/2012 | Kwan et al. | |
| 8,760,458 | B2 | 6/2014 | Wu et al. | |
| 9,858,902 | B2 | 1/2018 | Fritz et al. | |
| 9,942,412 | B1 | 4/2018 | Oroskar et al. | |
| 11,798,481 | B2 | 10/2023 | Lin et al. | |
| 12,175,943 | B2 * | 12/2024 | Wang | G09G 3/2014 |
| 2002/0089496 | A1 | 7/2002 | Numao | |
| 2003/0103046 | A1 | 6/2003 | Rogers et al. | |
| 2003/0160803 | A1 | 8/2003 | Willis | |
| 2004/0036968 | A1 | 2/2004 | Ito | |
| 2010/0128066 | A1 | 5/2010 | Murata et al. | |
| 2010/0177083 | A1 | 7/2010 | Yamashita | |
| 2012/0069060 | A1 | 3/2012 | Handschy et al. | |
| 2013/0063499 | A1 | 3/2013 | Tanaka et al. | |
| 2015/0245038 | A1 | 8/2015 | Clatanoff et al. | |
| 2017/0061866 | A1 * | 3/2017 | In | G09G 3/3275 |
| 2017/0330509 | A1 | 11/2017 | Cok et al. | |
| 2019/0347980 | A1 * | 11/2019 | Kuo | G09G 3/32 |
| 2019/0347990 | A1 | 11/2019 | Knez et al. | |
| 2019/0347994 | A1 | 11/2019 | Lin et al. | |
| 2020/0090630 | A1 | 3/2020 | Wang et al. | |
| 2020/0163124 | A1 | 5/2020 | Da et al. | |
| 2021/0158759 | A1 | 5/2021 | Lin et al. | |
| 2021/0201798 | A1 | 7/2021 | Kim et al. | |
| 2021/0225248 | A1 * | 7/2021 | Cheng | G09G 3/20 |
| 2021/0248961 | A1 | 8/2021 | Yang et al. | |
| 2023/0320147 | A1 * | 10/2023 | Son | G09G 3/3291 |
| 2025/0080823 | A1 * | 3/2025 | Cok | H04N 23/66 |

FOREIGN PATENT DOCUMENTS

| | | | |
|---|---|---|---|
| JP | 2004-86152 | A | 3/2004 |
| JP | 2008-276027 | A | 11/2008 |
| JP | 2011-076052 | A | 4/2011 |
| WO | 02069259 | A2 | 9/2002 |
| WO | 2019217242 | A | 11/2019 |

OTHER PUBLICATIONS

Korean Search Report ("WIPS") for Korean Patent Application No. 10-2022-7030170 dated Sep. 7, 2022; 29 pgs.

Office Action for Japanese Patent Application No. 2022-552483 dated Aug. 7, 2023; 3 pgs.

Notice of Final Rejection for Korean Patent Application No. 10-2022-7030170 dated Mar. 15, 2024; 4pgs.

* cited by examiner

DUAL-MEMORY DRIVING OF AN ELECTRONIC DISPLAY

CROSS-REFERENCE TO RELATED APPLICATIONS

This application is a continuation of U.S. patent application Ser. No. 17/949,949, entitled "DUAL-MEMORY DRIVING OF AN ELECTRONIC DISPLAY," filed Sep. 21, 2022, which is a continuation of U.S. patent application Ser. No. 17/196,759, entitled "DUAL-MEMORY DRIVING OF AN ELECTRONIC DISPLAY," filed Mar. 9, 2021, now U.S. Pat. No. 11,527,209, which is a non-provisional application claiming priority to U.S. Provisional Application No. 63/003,039, entitled "DUAL-MEMORY DRIVING OF AN ELECTRONIC DISPLAY," filed Mar. 31, 2020, each of which is hereby incorporated by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Methods and systems for reducing bandwidths, or amounts simultaneously transmitted, of image data transmitted and processed to prepare an image for presentation on an electronic display by implementing memory in pixels of the electronic display may provide immense value. Such an implementation of memory in the pixels may permit an elimination or reduction in size of a frame buffer associated with the electronic display. Having memory in the pixels may lessen the design complexity of electronic displays, as well, because the less image data that is concurrently transmitted to a pixel array of an electronic display, the simpler an electronic display may be designed. For example, the pixels may be programmed in smaller groups because memory in the pixel stores the values until a time of presentation of the image.

This disclosure describes an electronic display having one or more pixels that include memory and a driver that may help to decrease a bandwidth associated with transmitting and processing image data for presentation on an electronic display. The inclusion of the memory in the pixel may enable storage of image data prior to output to a light-emitting portion of the pixel. Thus, the memory in the pixel may reduce, or in some instances eliminate, a reliance on a frame buffer in an electronic display by acting as an individual frame buffer for the pixel. The memory in the pixel may be used in conjunction with a driver to cause a light-emitting portion of the pixel to emit light.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
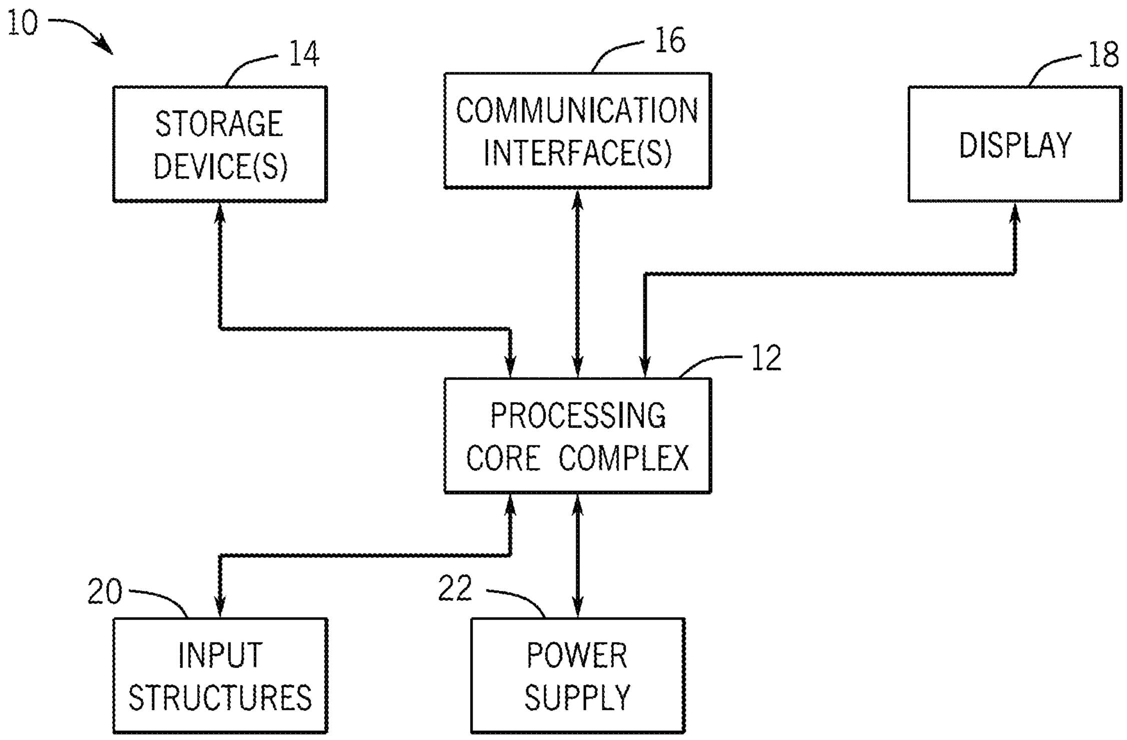
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic displays are found in numerous electronic devices, from mobile phones to computers, televisions, automobile dashboards, and many more. Electronic displays have achieved increasingly higher resolutions by reducing individual pixel size. Yet increasing resolutions may increase a difficultly associated with managing an increased amount of image data associated with the increased resolutions processed by processing circuitry prior to displaying an image, for example, by causing increased power consumption from processing increased amounts of image data. Furthermore, the increasing resolutions may increase a bandwidth used to communicate image data from the processing circuitry to a pixel array for presentation of the image because more image data is used to communicate the same image at a higher electronic display resolution.

Embodiments of the present disclosure relate to systems and methods for implementing memory-in-pixel circuitry that may be used as an individual frame buffer for each pixel. The systems and methods of this disclosure to implement memory-in-pixel circuitry may reduce transmission bandwidths of image data to pixel arrays for display because the pixel may store image data in the memory. In this way, a reliance on frame buffers to temporarily store the image data external to the pixel is reduced because the pixel has its own memory to store its own image data prior to display of the image data.

Memory may be implemented in pixel circuitry that includes a light-emitting diode (LED). An organic light-emitting diode (OLED) represents one type of LED that may be found in the pixel, but other types of LEDs or light-emitting elements may also be used. Other light-emitting or -permissive components that may be used in the pixel circuitry include components to support liquid crystal displays (LCDs), plasma display panels, and/or dot-matrix displays.

In some cases, some memory for each pixel may be included in the pixel circuitry while some memory for each pixel may be included in driving circuitry of the display. When memory implemented in the pixel is not used in combination with additional allocated external memory for the pixel, maximum bit depths for image data stored in memory may be constrained by physical footprint definitions specified for each pixel. For example, amount of memory used in each pixel, and thus the number of respective bits used to represent a target gray level for each pixel to reference when presenting an image, may be limited by an amount of space within a panel of a display dedicated for each pixel.

Separating the memory designated for each pixel in to the separate portions of the display may increase the amount of memory designated for each pixel and enable an increase in the number of respective bits used to represent the target gray level. For example, a same number of memory storage units may be included within the pixel as other memory-in-pixel panels but additional bits may be used to represent the target gray level as a result at least in part from including additional memory for the pixel in driving circuitry of the display, as will be appreciated.

Furthermore, in some cases, multiple driving cycles may be used to present one image frame. These multiple driving cycles may be thought of as "sub-frames," where the same memory unit for a particular pixel may be loaded with data multiple times within a duration of time allocated for presentation of an image frame. When driving a display using sub-frames to present a whole frame, the sub-frame periods may be leveraged to break a target gray level up into sub-frame-based chunks. For example, a certain portion of bits representing the target gray level may be used to drive the display to emit light during a first sub-frame while a different portion of the bits representing the target gray level may be used to drive the display during a second sub-frame, where the emission of light over the two sub-frames emits light that appears as the target gray level for the overall image frame.

Displays using memory-in-pixel techniques may also implement memory allocated for the pixel disposed in a driver for the display. Sub-frames may be leveraged in combination with and/or automatically through use of the internal memory to the pixel and external memory for the pixel. For example, a pixel may be driven to emit light according to data stored in external memory allocated for the pixel for a duration of time corresponding to a first sub-frame and driven to emit light according to data stored in memory internal to the pixel (e.g., memory-in-pixel) for at least a portion of a second sub-frame. The target gray level may define for how many sub-frames the pixel is driven from the internal memory and for how many sub-frames the pixel is driven from the external memory to cause a total light emission perceivable as the target gray level. In this way, the combination of the light emitted from the pixel during the first sub-frame and the light emitted from the pixel during the second sub-frame may be perceived by an observer of the display as corresponding to the target gray level for the pixel.

Splitting the driving of a pixel at a target gray level into multiple driving operations that span multiple sub-frames may improve pixel driving methods. The division into the multiple driving operations may be controlled by processing circuitry of the electronic device (e.g., a display driver, a controller), automatically using a counter-based system of the electronic device, or the like.

When the processing circuitry controls driving operations, each target gray level may be analyzed to determine a combination of driving operations to generate the desired light emission. The operations used to drive the pixel to emit light may include selectively driving the pixel from the memory internal to the pixel (e.g., memory-in-pixel), driving the pixel from the memory external to the pixel but allocated to the pixel (e.g., allocated external memory), or a combination thereof. Furthermore, it is noted that driving the pixel from the memory external to the pixel may also involve an unmodulated and/or continuous light emission instruction (or a no-light emission instruction) for a duration of a sub-frame. For example, a pixel may be driven to emit light for a duration of the sub-frame without expectation for the light emission to stop during the sub-frame and/or driven to not emit light for a duration of the sub-frame without expectation for light emission to begin during the sub-frame. Combining the unmodulated emission instructions with the modulation emission instructions may mean that the pixel is driven for a first sub-frame to emit an unmodulated light, driven for at least a portion of a second sub-frame to emit a modulated light (e.g., to fine tune the presented gray level during the first sub-frame), and driven for a third sub-frame to not emit light (e.g., unmodulated zero emission) after the target gray level has been presented using the first sub-frame and the second sub-frame. In this way, when a target gray level is greater than a threshold gray level, a different combination of operations may be used than when the target gray level is less than the threshold gray level.

When the counter-based system controls the driving operations, the pixel may be automatically switched between the driving operations described above in response to results from comparisons between a target gray level and a current count. For example, a subset of binary data representing a present count of a counter may be compared to the same bit positions of binary representing the target gray level at each change in count. While waiting for the subset of binary data representing the target gray level to match the subset of binary data representing the count, the pixel may be driven to emit unmodulated light. When the data stored in the corresponding bit positions matches, the pixel is driven according to the remaining binary data representing the target gray level, thereby driving the pixel to emit modulated light. It should be understood that when referred to as modulated light, the light emitted from the pixel may be emitted according to image data stored in memory of the pixel as opposed to image data stored in allocated external memory for the pixel.

When driving the pixel to emit modulated or unmodulated light (or no light), data overriding and/or memory disabling operations may be used. Data stored and transmitted to the memory internal to the pixel may be overridden or disabled by a control signal from affecting output of the pixel for a duration of a sub-frame. The control signal may disable the memory internal to the pixel and may permit the allocated external memory to drive the pixel.

For example, when the target gray level is between 0 and a first threshold, the memory internal to the pixel may be decoupled from at least a light-emitting portion of the sub-pixel, and thus may be temporarily not in use or may be supplied with a "0" value to do so. Disabling or not using the memory internal to the pixel may permit the allocated external memory to drive the pixel for a first sub-frame and memory internal to the pixel may drive the pixel for a second sub-frame. In some cases, an output from the allocated external memory and an output from a counter may be compared by a comparator. The output from the comparator may be used as the control signal to control coupling or decoupling of the memory internal to the pixel to the light-emitting portion of the pixel. However, in some cases, the control signal may be generated by the controller or driver to directly control the operations.

Usage of two or more allocated memories may improve driving methods by, for example, extending possibilities of driving ranges beyond what may be permitted by the physical boundaries of the panel of pixels. For example, memory storing 6 bits of data may be included within the pixel but the pixel may be driven to emit light according to 8 bits of data (e.g., 256 gray level options) without using the footprint of 8 bits of memory internal to the pixel as opposed to being limited to the 6 bits of data (e.g., 64 gray level options). Furthermore, the memory internal to the pixel may be loaded with data for emission while or in parallel to the pixel emitting light during the first sub-frame refresh according to data stored in the allocated external memory. Driving pixels as discussed herein may leverage single pulse width modulation driving methods to improve perceivable appearances of the display relative to other memory-in-pixel driving methods. Indeed, using single pulse width modulation driving methods may improve on driving methods, such as binary pulse width modulation (BPWM) driving methods, since other driving methods may introduce visual artifacts, such as visual artifacts from slow charging of a light-emitted diode (LED) of a pixel being driven with binary pulse width modulation.

To help illustrate, an electronic device 10 is shown in FIG. 1. As described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example and is intended to illustrate the types of components that may be present in an electronic device 10. The electronic device 10 may include, among other things, a processing core complex 12 such as a system on a chip (SoC) and/or one or more processing circuits, one or more storage devices (e.g., storage device 14), one or more communication interfaces (e.g., communication interface 16), one or more electronic displays (e.g., electronic display, display 18), one or more input structures (e.g., input structure 20), and one or more power supplies (e.g., power supply 22). The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components.

Using pixels containing light-emitting components (e.g., LEDs, OLEDs), the display 18 may show images generated by the processing core complex 12. The processing core complex 12 may be operably coupled with the storage device 14. The processing core complex 12 may execute instructions stored in the storage device 14 to perform operations, such as generating and/or transmitting image data. As such, the processing core complex 12 may include one or more general purpose microprocessors, one or more application specific integrated circuits (ASICs), one or more field programmable logic arrays (FPGAs), or any combination thereof.

In addition to instructions, the storage device 14 may store data to be processed by the processing core complex 12. Thus, in some embodiments, the storage device 14 may include one or more tangible, non-transitory, computer-readable mediums. The storage device 14 may be volatile and/or non-volatile. For example, the storage device 14 may include random access memory (RAM) and/or read only memory (ROM), rewritable non-volatile memory such as flash memory, hard drives, optical discs, and/or the like, or any combination thereof.

As depicted, the processing core complex 12 may also be operably coupled with the communication interface 16. In some embodiments, the communication interfaces 16 may facilitate communicating data with another electronic device and/or a network. For example, the communication interface 16 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a 4G, or Long-Term Evolution (LTE) cellular network, 5G, or the like.

Additionally, as depicted, the processing core complex 12 is also operably coupled to the power supply 22. In some embodiments, the power supply 22 may provide electrical power to one or more components in the electronic device 10, such as the processing core complex 12 and/or the display 18. Thus, the power supply 22 may include any suitable source of energy, such as a rechargeable lithium polymer (Li-poly) battery and/or an alternating current (AC) power converter.

As depicted, the electronic device 10 is also operably coupled with the input structure 20. In some embodiments, the input structure 20 may facilitate user interaction with the electronic device 10, for example, by receiving user inputs. Thus, the input structure 20 may include a button, a keyboard, a mouse, a trackpad, and/or the like. Additionally, in some embodiments, the input structure 20 may include touch-sensing components in the display 18. In such embodiments, the touch sensing components may receive user inputs by detecting occurrence and/or position of an object touching the surface of the display 18.

In addition to enabling user inputs, the display 18 may include a display panel with one or more display pixels. As described above, the display 18 may control light emission from the display pixels to present visual representations of information, such as a graphical user interface (GUI) of an operating system, an application interface, a still image, or video content, by displaying frames based at least in part on corresponding image data. As depicted, the display 18 is operably coupled to the processing core complex 12. In this manner, the display 18 may display frames based at least in part on image data generated by the processing core complex 12. Additionally or alternatively, the display 18 may display frames based at least in part on image data received via the communication interface 16 and/or the input structure 20.

Figure 2:
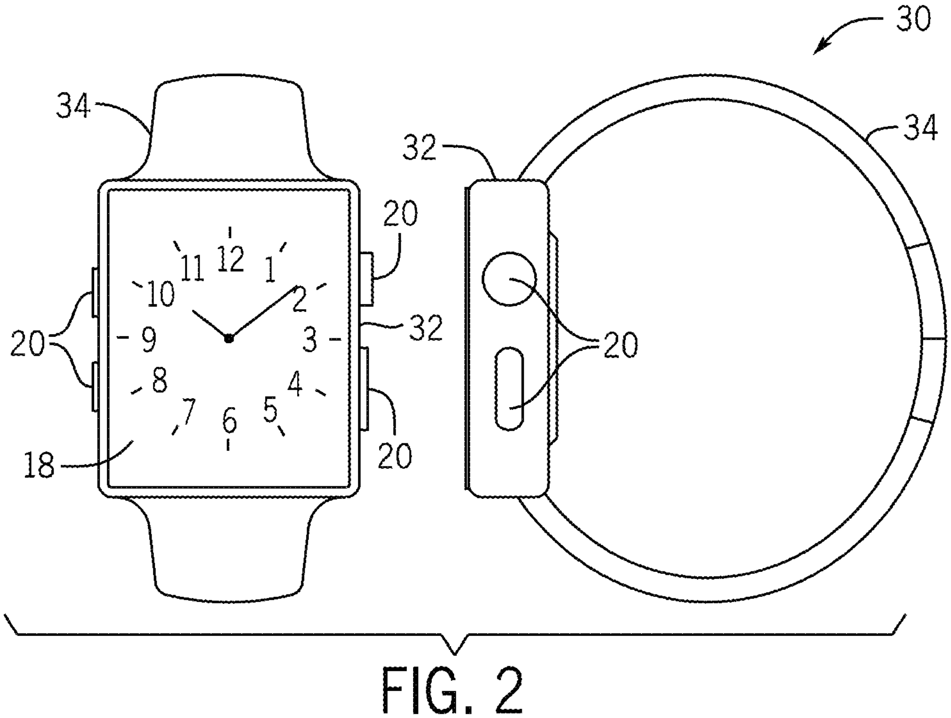
FIG. 2 is a perspective view of a watch representing an embodiment of the electronic device of FIG. 1, in accordance with an embodiment.

As may be appreciated, the electronic device 10 may take a number of different forms. As shown in FIG. 2, the electronic device 10 may take the form of a watch 30. For illustrative purposes, the watch 30 may be any Apple Watch® model available from Apple Inc. As depicted, the watch 30 includes an enclosure 32 (e.g., housing). In some embodiments, the enclosure 32 may protect interior components from physical damage and/or shield them from electromagnetic interference (e.g., house components). A strap 34 may enable the watch 30 to be worn on the arm or wrist. The display 18 may display information related to the operation of the watch 30. Input structures 20 may enable the user to activate or deactivate watch 30, navigate a user interface to a home screen, navigate a user interface to a user-configurable application screen, activate a voice-recognition feature, provide volume control, and/or toggle between vibrate and ring modes. As depicted, the input structures 20 may be accessed through openings in the enclosure 32. In some embodiments, the input structures 20 may include, for example, an audio jack to connect to external devices.

Figure 3:
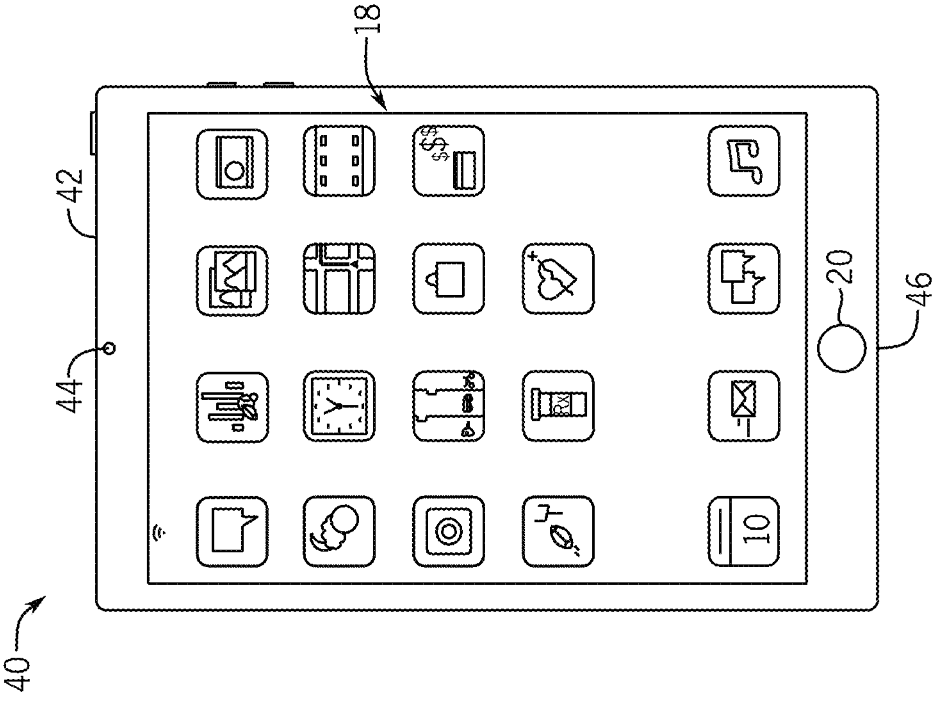
FIG. 3 is a front view of a tablet device representing an embodiment of the electronic device of FIG. 1, in accordance with an embodiment.

The electronic device 10 may also take the form of a tablet device 40, as shown in FIG. 3. For illustrative purposes, the tablet device 40 may be any iPad® model available from Apple Inc. Depending on the size of the tablet device 40, the tablet device 40 may serve as a handheld device such as a mobile phone. The tablet device 40 includes an enclosure 42 through which input structures 20 may protrude. In certain examples, the input structures 20 may include a hardware keypad (not shown). The enclosure 42 also holds the display 18. The input structures 20 may enable a user to interact with a GUI of the tablet device 40. For example, the input structures 20 may enable a user to type a Rich Communication Service (RCS) text message, a Short Message Service (SMS) text message, or make a telephone call. A speaker 44 may output a received audio signal and a microphone 46 may capture the voice of the user. The tablet device 40 may also include a communication interface 16 to enable the tablet device 40 to connect via a wired connection to another electronic device.

Figure 4:
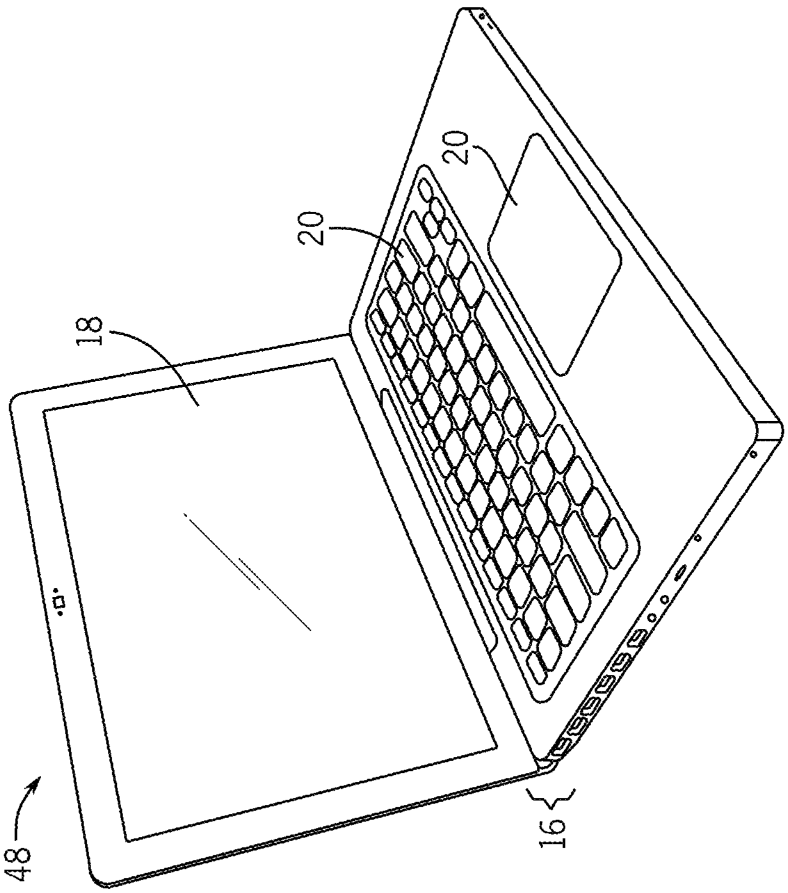
FIG. 4 is a front view of a computer representing an embodiment of the electronic device of FIG. 1, in accordance with an embodiment.

FIG. 4 illustrates a computer 48, which represents another form that the electronic device 10 may take. For illustrative purposes, the computer 48 may be any MacBook® or iMac® model available from Apple Inc. It should be appreciated that the electronic device 10 may also take the form of any other computer, including a desktop computer. The computer 48 shown in FIG. 4 includes the display 18 and input structures 20 that include a keyboard and a track pad. Communication interfaces 16 of the computer 48 may include, for example, a universal serial bus (USB) connection.

In any case, as described above, operating an electronic device 10 to communicate information by displaying images on its display 18 generally consumes electrical power. Additionally, as described above, electronic devices 10 often store a finite amount of electrical energy. Thus, to facilitate improving power consumption efficiency, an electronic device 10, in some embodiments, may include a display 18 that implements memory-in-pixel as a way to reduce, or eliminate, use of an external frame buffer in displaying images, and thus reduces power consumed by use of the frame buffer in displaying images and/or reducing a bandwidth of image data being received into the display 18. In some cases, an internal frame buffer (e.g., located in the display 18, such as in a display driver integrated circuit of the display 18) may be used additionally or alternatively to memory-in-pixel techniques. By implementing memory-in-pixel or related techniques, a display 18 may be programmed with smaller bandwidths of image data, further enabling power consumption savings. In addition, a display 18 using memory in the pixel or in an onboard frame buffer may have a less complex design than a display 18 without memory in the pixel or without an onboard frame buffer. These benefits may be realized because a pixel retains data transmitted to its memory until new image data is written to the memory.

Similarly, portions of image data may program a subset of pixels associated with the display 18 at a time, including between sub-frames. An image to be displayed is typically converted into numerical data, or image data, such that the image is interpretable by components of the display 18. In this way, image data itself may be divided into small "pixel" portions, each of which may correspond to a pixel portion of the display 18, or of a display panel corresponding to the display 18. In some embodiments, image data is represented through combinations of red-green-blue light such that one pixel appearing to have a single color is really three sub-pixels respectively emitting a proportion of red, green, and blue light to create the single color. In this way, numerical values, or image data, that quantify the combinations of red-green-blue light may correspond to a digital luminance level, or a gray level, that associates a luminance intensity (e.g., a brightness) of a color of the image data for those particular sub-pixels. As will be appreciated, the number of gray levels in an image usually depends on a number of bits used to represent the gray levels in a particular display 18, which may be expressed as 2N gray levels where N corresponds to the number of bits used to represent the gray levels. By way of example, in an embodiment where a display 18 uses 8 bits to represent gray levels, the gray level ranges from 0, for black or no light emitted by the pixel, to 255, for maximum light and/or full light capable of being emitted by the pixel, for a total of 256 potential gray levels. Similarly, a display 18 using 6 bits may use 64 gray level increments to represent a luminance intensity for each sub-pixel (e.g., to specify a value between no light emission and maximum light emission for each sub-pixel).

Having memory internal to pixels of the display 18 may enable image data to transmit to sub-pixels associated with one color without image data having to transmit to additional sub-pixels associated with a second color at the same time. For the purposes of this disclosure, sub-pixels are discussed in terms of red-green-blue color channels, where a color channel is a layer of image data including gray levels for a single color where when combined with additional color channels creates an image of a true, or desired, color, and where the image data for a color channel corresponds to image data transmitted to a sub-pixel for the color channel. However, it should be understood that any combination of color channels and/or sub-pixels may be used, such as, blue-green-red, cyan-magenta-yellow, and/or cyan-magenta-yellow-black.

Figure 5:
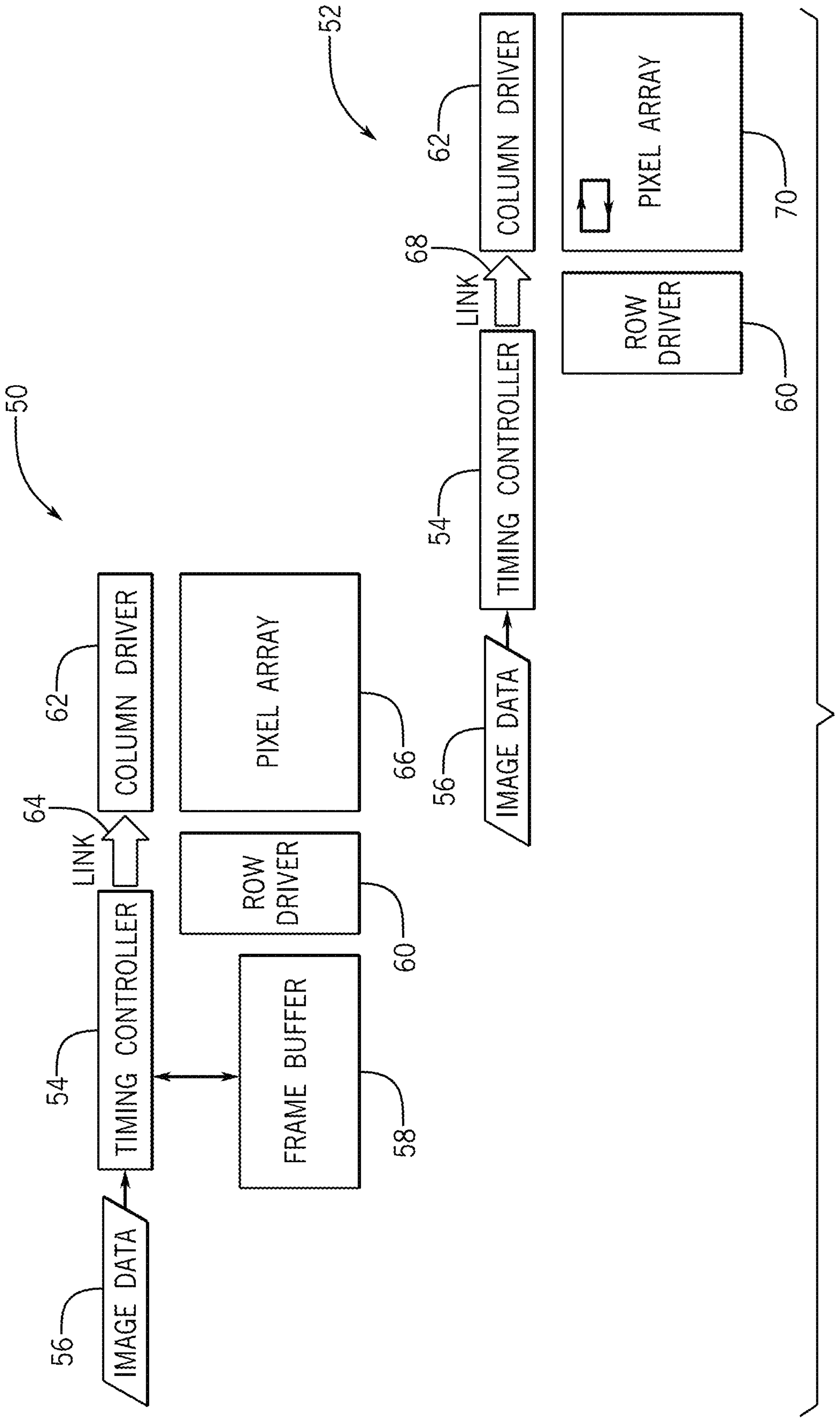
FIG. 5 is a block diagram of a display system of the electronic device of FIG. 1, in accordance with an embodiment.

To help illustrate, a display system 50 associated with a display 18 that does not implement memory-in-pixel and a display system 52 associated with a display 18 that does implement memory-in-pixel, which may each respectively be implemented in an electronic device 10, is shown in FIG. 5. The display system 50 includes a timing controller 54 to receive image data 56, a frame buffer 58, a row driver 60 and a column driver 62 communicatively coupled through communicative link 64 to the timing controller 54, and a pixel array 66 that receives control signals from the column driver 62 and the row driver 60 to create an image on the display 18. Furthermore, the display system 52 includes a timing controller 54 to receive image data 56, a row driver 60 and a column driver 62 communicatively coupled through a communicative link 68 to the timing controller 54, and a pixel array 70 implementing memory-in-pixel techniques that receives control signals from the column driver 62 and the row driver 60 to create an image on the display 18.

In preparing to display an image, the display system 50 may receive the image data 56 at the timing controller 54. The timing controller 54 may receive and use the image data 56 to determine clock signals and/or control signals to control a provision of the image data 56 to the pixel array 66 through the column driver 62 and the row driver 60. Additionally or alternatively, in some embodiments, the image data 56 is received by the frame buffer 58.

In either case, the frame buffer 58 may serve as external storage for the timing controller 54 to store the image data 56 prior to output to the column driver 62 and/or the row driver 60. The timing controller 54 may transmit the image data 56 from the frame buffer 58 to the column driver 62 and/or the row driver 60 through the communicative link 64.

The communicative link 64 is large enough (e.g., determined through transmission bandwidth of image data) to simultaneously transmit image data 56 associated with all the channels to the row driver 60 and/or the column driver 62, for example, the image data 56 associated with a red channel, a green channel, and a blue channel. In this way, the communicative link 64 communicates image data 56 associated with a respective pixel of the pixel array 66 for the red channel, the green channel, and the blue channel at the same time. The column driver 62 and the row driver 60 may transmit control signals based on the image data 56 to the pixel array 66. In response to the control signals, the pixel array 66 emits light at varying luminosities, or brightness indicated through gray levels ranging from, for example, 0 to 255, to communicate an image.

However, the display system 52 receives the image data 56 at the timing controller 54. The timing controller 54 may use the image data 56 to determine clock signals used to provision the image data 56 to the memory-in-pixel pixel array 70. The timing controller 54 transmits the image data 56 to the row driver 60 and/or the column driver 62 to program the memory of the pixel array 70 with digital data signals associated with the image data 56, where the digital data signals indicate the emission brightness/gray level for the pixels of the pixel array 70.

By implementing memory-in-pixel systems and methods, the display system 52 may reduce a bandwidth of signals communicated over communicative link 68, for example, when compared to a bandwidth of signals communicated over the communicative link 64. In some instances, a single channel of image data 56 may transmit through the communicative link 64 (e.g., red channel), as opposed to all channels being simultaneously transmitted to the pixel array 66 (e.g., red-green-blue channels). In this way, the communicative link 68 communicates image data 56 associated with a respective pixel of the pixel array 66 for the red channel, the green channel, and the blue channel at different times, causing a decrease in an overall bandwidth of signals used to communicate image data 56. Decreasing an overall bandwidth of the communicative link 68 may lead to a decrease in power consumption of the electronic device 10 because processing less data (e.g., a single channel of image data) at a given time may consume fewer processing resources than processing more data (e.g., three channels of image data).

Figure 6:
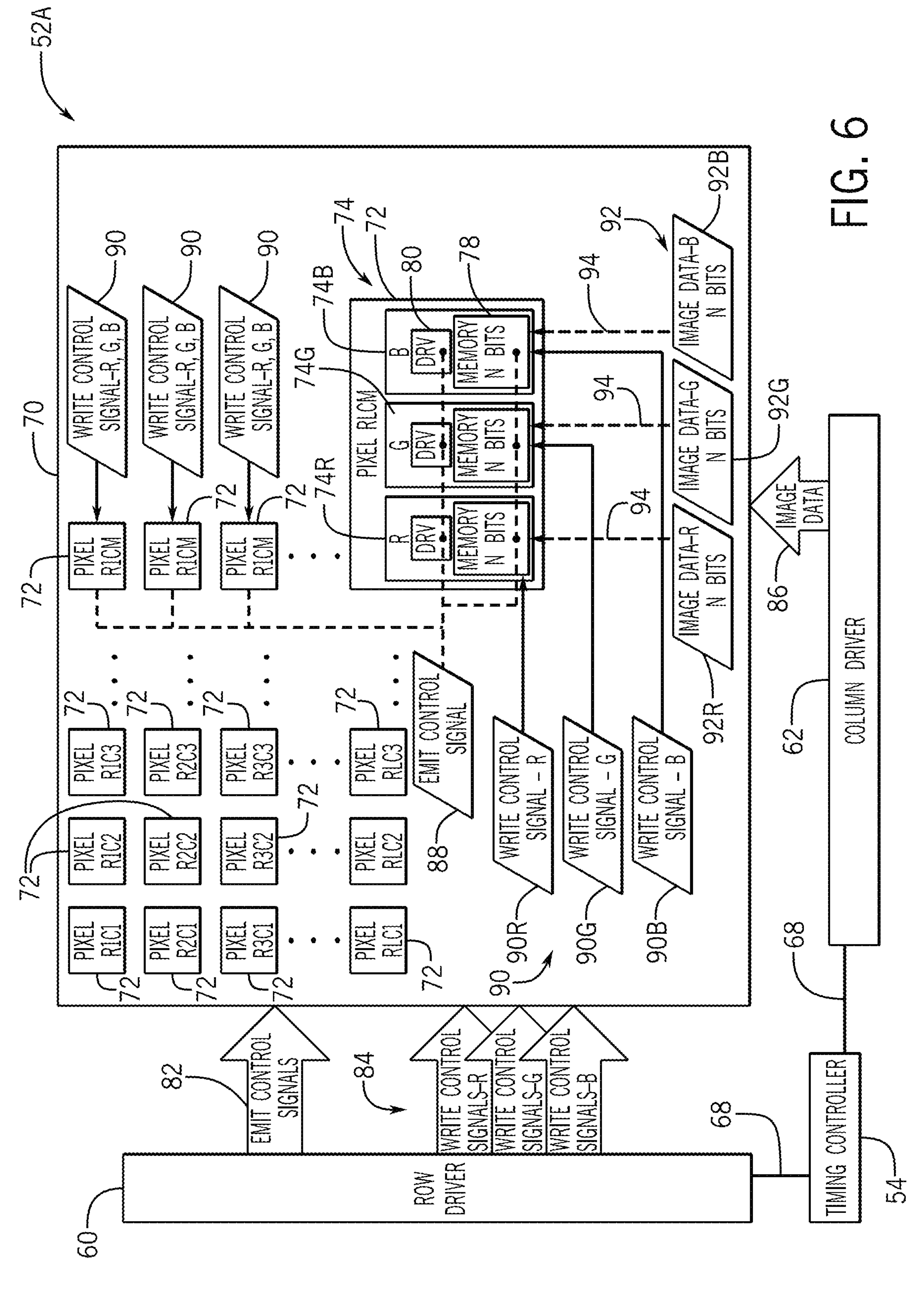
FIG. 6 is a block diagram of a pixel array of the display system of FIG. 5, in accordance with an embodiment.

To elaborate on operating the pixel array 70 with memory-in-pixel to display images, FIG. 6 is a block diagram of an example display system 52, display system 52A, implementing memory-in-pixel. The display system 52A includes a pixel array 70 of L rows by M columns with one or more pixels 72. Each pixel 72 may include sub-pixels 74 corresponding to color channels of the display 18, for example, a red sub-pixel 74R, a green sub-pixel 74G, and a blue sub-pixel 74B. Each of the sub-pixels 74 may include a memory 78 to store up to N bits and a driver (DRV) 80 to operate the sub-pixel 74 to emit light. It should be appreciated that the depicted display system 52A is merely intended to be illustrative and not limiting. For example, in some embodiments, the pixel array 70 may include sub-pixels 74 to emit various amounts of cyan, yellow, and magenta light corresponding to cyan-yellow-magenta color channels instead of, or in addition to, the red-green-blue color channels.

Explaining operation of the display system 52A, the timing controller 54 receives image data 56 corresponding to a next image to be displayed on a display 18 having the pixel array 70. The timing controller 54 may receive the image data 56 while an image frame is presented via the display 18. The timing controller 54 may generate control signals and/or clocking signals in response to the image data 56. These generated control signals and/or clocking signal may be related to operating rows of pixels 72 and/or related to operating columns of pixels 72, and thus may be transmitted respectively to row driver 60 and/or column driver 62.

The row driver 60 is responsive to the signals associated with the image data 56 transmitted from the timing controller 54 and generates emit control signals 82 and write control signals 84 for each red-green-blue (RGB) channel. The column driver 62, also being responsive to the signals associated with the image data 56 transmitted from the timing controller 54, generates image data 86 to be transmitted to the memory 78 of each of the pixels 72. The column driver 62 may generate image data 86 in response to the signals associated with the image data 56 and/or the image data 56, in some embodiments, however, image data 56 transmits to each of the pixels 72 as image data 86. The column driver 62 generates data of size N bits for each sub-pixel 74, matching a size of the memory 78 which is also size N bits.

Generally, through transmission of the emit control signals 82, the write control signals 84, and the image data 86, the pixels 72 are operated to emit light to create an image on a display 18. Each of the pixels 72 receives a respective emit control signal 88 of the emit control signals 82 transmitted from the row driver 60, a respective three write control signals 90 of the write control signals 84, and respective image data 92 for the channels of the pixel 72, for example, N bits of image data for the red channel (image data-R) 92R, N bits of image data for the green channel (image data-G) 92G, and N bits of image data for the blue channel (image data-B) 92B. The write control signals 84 may enable a memory 78 of the pixel 72 to be programmed by the image data 86 transmitted by the column driver 62. In addition, a respective emit control signal 88 of the emit control signals 82 may control whether the pixel 72 is able to emit light. The emit control signal 88 transmits to respective pixels 72 of a column. An enabled emit control signal 88 may activate a driver 80 causing digital image data 92 from a memory 78 to transmit to a light-emitting portion of the pixel 72, for example, a light-emitting diode associated (LED) with a sub-pixel 74, that uses analog data signals to cause light emitted from the pixel 72. In the depicted embodiment, columns of pixels 72, for example, pixels 72 R1C1, R2C1, R3C1, to RLC1 in a first column receive a same emit control signal 88. Image data 92 transmitted to a pixel 72 causes the pixel 72 to emit light of an overall color and/or brightness.

A perceived color emitted from the pixel 72 changes based on the light emitted from each of the three channels of the pixel 72, that is, the light emitted from each respective sub-pixel. For example, operating each sub-pixel to output a brightness of 0, causes the pixel 72 to appear to be off, while operating a red sub-pixel 74R to output a brightness of 100%, a green sub-pixel 74G to output a brightness of 50%, and a blue sub-pixel 74B to output a brightness of 0% may cause a pixel 72 to emit an overall color that is perceived as an orange color. Thus, data is rendered and transmitted to each sub-pixel 74 to correspond to individual color channels of a pixel 72.

Implementing memory 78 in a pixel 72 enables image data 92 to be programmed into the pixel 72 prior to a desired presentation time of the image. In some embodiments, an enabled write control signal 90 causes the memory 78 to clear (or overwrite) stored image data 92, where not enabling a write control signal 90 may cause the memory 78 to retain the programmed image data 92. For example, to write new image data, a write control signal-R 90R may cause a memory 78 of a red sub-pixel 74R to clear, enabling the writing of new image data, image data-R 92R to be loaded into the memory 78. In this example, a write control signal-B 90B was not enabled, thus the memory 78 of the blue sub-pixel 74B does not clear and continues to retain its programmed image data, image data-B 92B. Having memory 78 in pixels 72 is an improvement to display technologies and processing technologies because memory 78 enables portions of image data 86 to be written at a time instead of a whole frame of data, causing improved use of available bandwidth to communicate image data for display on a display 18, as well as improvements to power consumption used for processing image data, as explained earlier with reference to FIG. 5.

In the pixel array 70, image data 86 is communicated from the column driver 62 to the sub-pixels 74 through a direct communicative coupling, for example, through a communicative coupling 94. In some embodiments, a multiplexing circuit may be used to control transmission of image data 86 to sub-pixels 74 such that a multiplexing control signal is used by the column driver 62 to arbitrate transmission of image data to a sub-pixel 74, for example, where in such arbitration a red sub-pixel 74R may not receive image data at the same time as a blue sub-pixel 74B and/or a green sub-pixel 74G receives image data.

Figure 7:
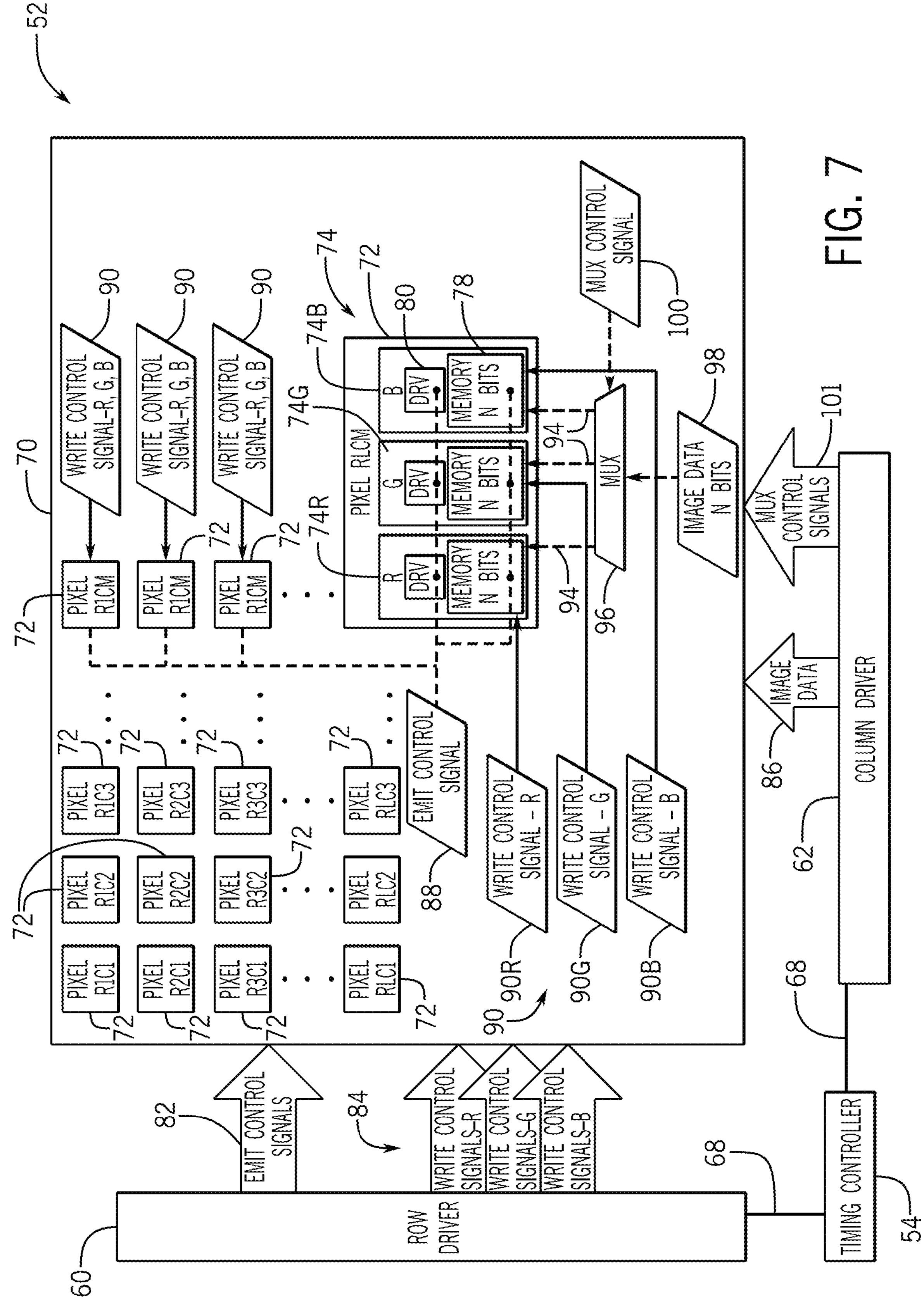
FIG. 7 is a block diagram of another example pixel array of the display system of FIG. 5, in accordance with an embodiment.

To elaborate, FIG. 7 is a block diagram of another example display system 52, display system 52B, associated with a display 18 implementing memory-in-pixel techniques. The display system 52B, similar to the display system 52A shown in FIG. 6, includes a pixel array 70 of L rows by M columns with one or more pixels 72 each having sub-pixels 74, for example, a red sub-pixel 74R, a green sub-pixel 74G, and a blue sub-pixel 74B, where each of the sub-pixels 74 includes a memory 78 to store up to N bits and a driver (DRV) 80 to operate the sub-pixel 74 to emit light. It should be appreciated that the depicted display system 52B is merely intended to be illustrative and not limiting. It is noted functions and/or descriptions of the display system 52 that are common to both FIG. 6 and FIG. 7 are relied upon herein.

In the display system 52B in FIG. 7, the pixel array 70 includes a multiplexing circuit 96 that receives image data 98 of size N bits from the column driver 62. The multiplexing circuit 96 is responsive to a respective multiplexing control signal (MUX control signal) 100 of multiplexing control signals 101. The MUX control signal 100 may cause the multiplexing circuit 96 to output data to a sub-pixel 74 of a pixel 72. In this way, the column driver 62, through emission of the MUX control signal 100, may operate to program a sub-pixel 74 (e.g., one color channel) of a pixel 72 at a time via, for example, a communicative coupling 94. For the pixel array 70, various embodiments of sub-pixel 74 circuits may be used.

Figure 8:
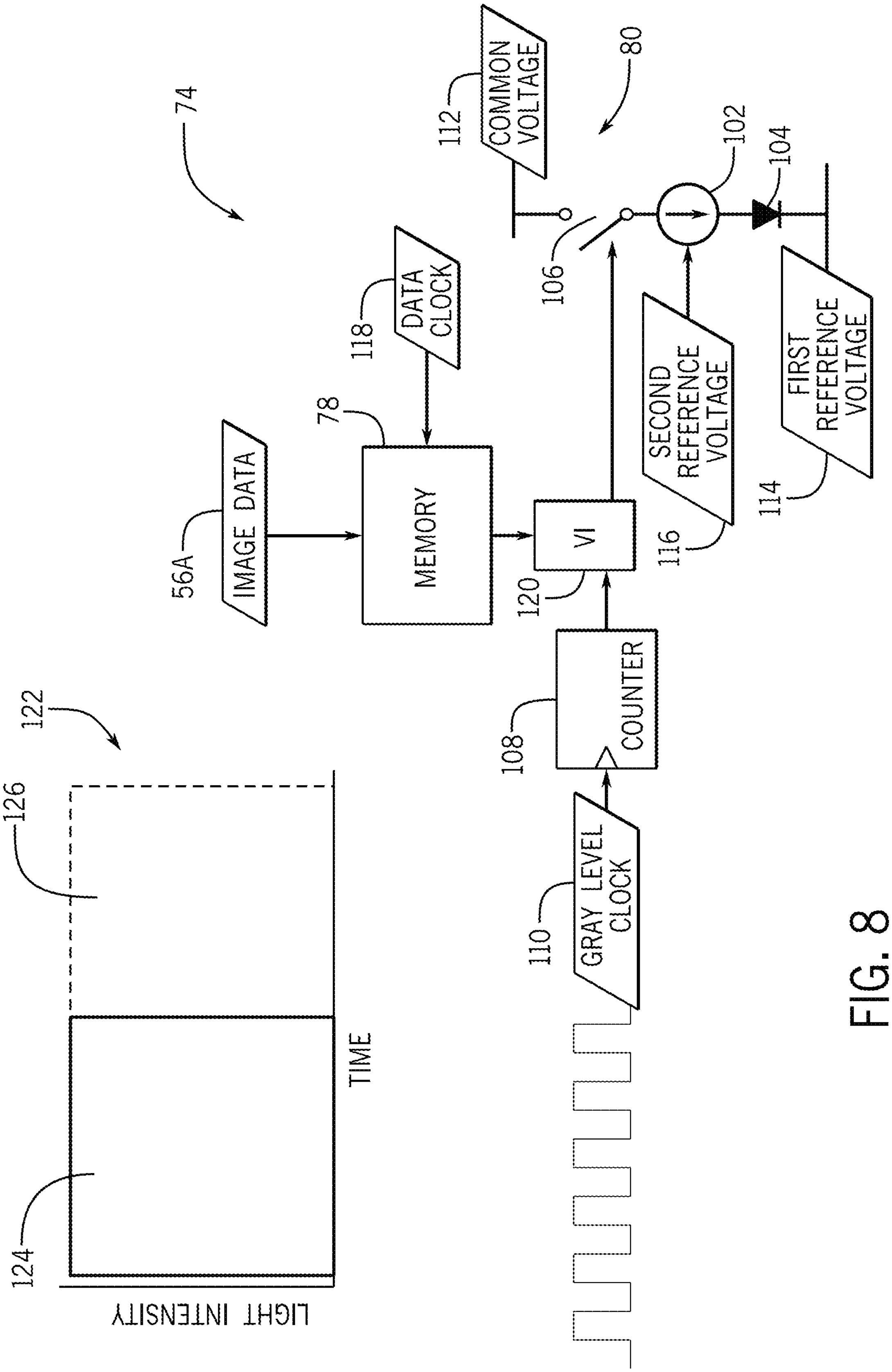
FIG. 8 is a block diagram of a pixel of the pixel array of FIG. 6 that emits light according to a single pulse width modulation emission scheme, in accordance with an embodiment.

An example of an embodiment of a sub-pixel 74 implementing memory-in-pixel techniques is shown in FIG. 8. FIG. 8 is a block diagram of a sub-pixel 74 that is driven using single pulse width driving methods (e.g., single pulse width modulation emission scheme). The sub-pixel 74 includes a memory 78, a driver 80, a current source 102, a light-emitting component (e.g., circuitry, light-emitting diode (LED) 104), a switch 106, and a counter 108. The sub-pixel 74 may receive a variety of signals including a portion of image data 56 corresponding to an operation of the sub-pixel 74 for a present frame to be rendered (e.g., image data 56A), a gray level clock 110, a common voltage 112, a first reference voltage 114, a second reference voltage 116, and a data clock 118. It should be appreciated that the depicted sub-pixel 74 is merely intended to be illustrative and not limiting. For example, memory 78 may be an 8-bit register or any suitable memory circuit to store any suitable number of bits. The depicted sub-pixel 74 may emit according to a single pulse width modulation emission scheme. Furthermore, as described above, the image data 56A may correspond to image data 92 transmitted in accordance with a non-multiplexing driving scheme (e.g., as described at least partially with FIG. 6) and/or to image data 98 transmitted in accordance with a multiplexing driving scheme (e.g., as described at least partially with FIG. 7).

To explain operation of the sub-pixel 74, image data 56A transmits to the memory 78 from, for example, a column driver 62. Additionally or alternatively, image data 92, image data 56, or any suitable image data may be transmitted to the memory 78 for storage. After receiving the image data 56A, the memory 78 stores the image data 56A clocked in by the data clock 118. The image data 56A may be represented by binary data. The memory 78 may output the image data 56A to a comparator 120 (e.g., comparator circuitry), such that at each increment of the counter 108, the total count is checked against the image data 56A stored in the memory 78 to identify when the total count is greater than or equal to the image data 56A.

When the comparator 120 determines that the count is not greater than or equal to the image data 56A stored in the memory 78, the comparator 120 generates a control signal to operate the switch 106, causing the LED 104 to emit light. The operation of the switch 106 occurs in response to varying emission periods (e.g., defined by how large of a number is stored as the image data 56A in the memory 78) as a method to modulate emission of light from the LED 104, causing the perceived brightness of the sub-pixel 74 to change as the modulation changes. In this way, the switch 106 may be considered a driving transistor that activates based at least in part on digital data signal, such as the image data 56A and/or an output from the comparator 120. The switch 106, or any switch described herein, may be any suitable switching device, such as a metal-oxide-semiconductor field-effect transistor (MOSFET). In this way, the electronic device 10 may include one or more p-type MOSFETs and/or n-type MOSFETs. Control signal levels may be adjusted to accommodate usage of different types of switches. For example, a p-type MOSFET may be used as a switch in the figures and described as such, but in an actual implementation be an n-type MOSFET, and thus may receive control signals of opposite polarity or adjusted amplitude when operating the pixel 72.

For example, through the relationship between the output from the comparator 120 and the switch 106, image data 56A equaling "00000000" may cause the LED 104 to not emit light while image data 56A equaling "10101100," or any non-zero number, may cause the LED 104 to be perceived as brighter. The image data 56A equaling "10101100" may be perceived as brighter because the sub-pixel 74 operates to emit light in response to each logical high value, "1," through the value causing the switch 106 to activate, permitting light to emit from the LED 104.

The longer a duration of time that the switch 106 is activated for during an emission period, the brighter a pixel is perceived because the more light is emitted over time. In some cases, image data 56A may be derived from a desired gray level for the sub-pixel 74 without being an exact binary representation of the gray level, such as when a proportion is used to represent a target gray level for the pixel. However, it should be noted that there may be scenarios where the target gray level for the sub-pixel 74 does indeed equal the binary representation transmitted via image data 56A.

The depicted sub-pixel 74, having memory-in-pixel, may emit according to a single pulse width emission scheme. To explain operation of the sub-pixel 74, image data 56A transmits to the memory 78, for example, from a column driver 62, for storage. Additionally or alternatively, image data 92, image data 56, or any suitable image data may be transmitted to the memory 78 for storage. In some embodiments, the image data 56A may be clocked into the memory 78 by the data clock 118, for example, on a rising edge, falling edge, or both, of the data clock 118. The image data 56A communicated to the sub-pixel 74 may correspond to a desired gray level at which the sub-pixel 74 is to emit light. Using the image data 56A stored in the memory 78, the comparator 120 determines if a current number represented by the counter 108 is less than or equal to the image data 56A in memory 78. In other words, the counter 108 counts up to the number indicated by the image data 56A, and in response to the number represented by the counter 108 meeting a condition, for example, being greater than or equal to the number indicated by the image data 56A, the comparator 120 outputs a control signal to open the switch 106 when the condition is met. When the condition is not met, the comparator 120 continues to output a control signal to keep the switch 106 closed, and thus to continue light emission from the LED 104. Additionally or alternatively, the comparator 120 may enable a deactivation control signal to cause the opening of the switch 106. For instance, if the memory 78 stores a binary sequence of 10110101 corresponding to the number 181, the comparator 120 will check if the counter 108 has counted to the number 181, and after the counter 108 exceeding the number 181, the comparator 120 transmits a signal to open the switch 106, thereby stopping light emission from the LED 104.

When the switch 106 closes, an electrical connection is created between the common voltage 112 and the first reference voltage 114. This may cause current from current source 102 to transmit through the LED 104, causing light to emit from the sub-pixel 74. Thus, emission periods of the sub-pixel 74 may be varied to control a perceived light emitted from the sub-pixel 74 through changing a number indicated by the image data 56A. Additionally or alternatively, in some embodiments, the second reference voltage 116 is included to alter an overall current value used to control light emitted from the LED 104. For instance, the second reference voltage 116 may increase a sensitivity of the LED 104 to current changes such that a lower current value may be used to cause light to emit from the LED 104, or used to enable the LED 104.

The counter 108 counts from 0 to 255 and increments based on a gray level clock 110, for example, a rising edge of the gray level clock 110. Periods of the gray level clock 110 represent the time difference between increments of the gray level for a display 18, for example, a difference in emission between emitting a gray level of 100 and emitting a gray level of 101. In this way, the counter 108 counts up to the number represented by the image data 56A stored in memory 78 subsequently causing emission to occur for the time period corresponding to the desired gray level. The counter 108 may continue to count beyond the number represented by the image data 56A stored in memory 78 on to a maximum value, for example, 255, and may restart counting at a minimum value, for example, 0. Thus, in some embodiments, a counting range of the counter 108 may be defined through design of the counter 108, for example, through a number of registers and/or logical components included in the counter 108. By the time the counter 108 restarts counting at 0, additional image data 56A may be stored into memory 78 to begin comparison for a next emission period of a gray level associated with the additional image data 56A.

Through following this emission scheme, the sub-pixel 74 may follow a single pulse width modulation emission scheme. A representation of an emission of light from a sub-pixel 74 following a single pulse width modulation emission scheme is shown in graph 122. The graph 122 includes an actual emission period 124 and a total emission period 126. The total emission period 126 corresponds to a total length of emission represented by a maximum number transmitted as image data 56A, for example, 255, and may correspond to a maximum perceived brightness of light emitted from the sub-pixel 74. The actual emission period 124 corresponds to a period of time a sub-pixel 74 emitted light for according to a number less than the maximum transmitted as the image data 56A, for example, from the counter 108. The counter 108 increments from 0 to 255 taking the amount of time represented by the total emission period 126 while the comparator 120 enables light to emit for the amount of time represented by the actual emission period 124. In this way, a sub-pixel 74 may emit light of varying perceived brightness.

Figure 9:
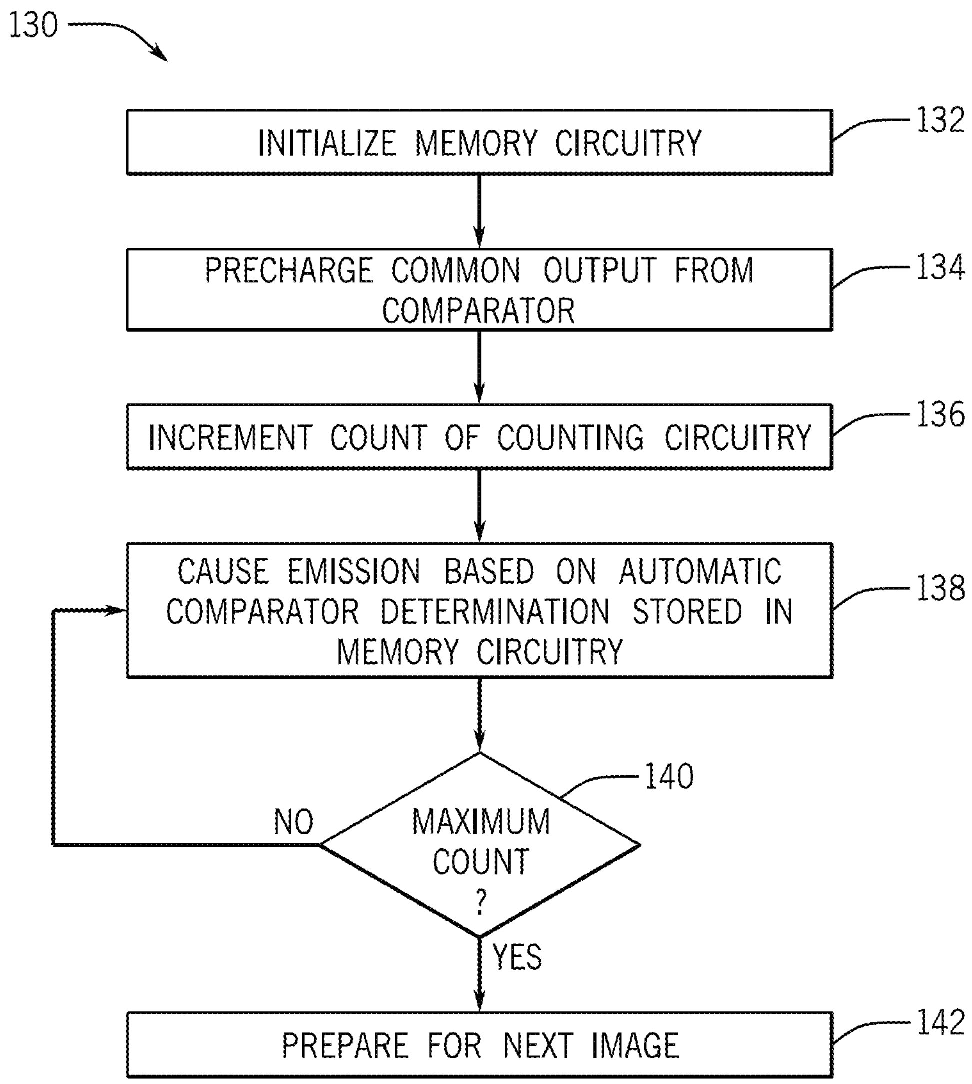
FIG. 9 is a process for operating the pixel of FIG. 8, in accordance with an embodiment.

To elaborate on operation of the sub-pixel 74 depicted in FIG. 8, a process 130 for operating the sub-pixel 74 having the comparator 120 and the memory 78 is described in FIG. 9. Generally, the process 130 includes initializing memory circuitry (block 132), precharging common output from comparator (block 134), incrementing count of counting circuitry (block 136), causing emission based on automatic comparator determination stored in memory circuitry (block 138), determining if counting circuitry has reached a maximum count (block 140). In response to the counting circuitry reaching the maximum count, preparing for next image (block 142), and in response to the counting circuitry not reaching the maximum count, continuing to cause emission based on automatic comparator determination stored in memory circuitry (block 138). In some embodiments, the process 130 may be performed at least in part by executing instructions stored in a tangible, non-transitory, computer-readable medium, such as the storage device 14, using processing circuitry, such as the processing core complex 12. Additionally or alternatively, the process 130 may be implemented at least in part based on circuit connections formed in display controlling circuitry, such as a row driver 60, a column driver 62, and/or a timing controller 54.

Thus, in some embodiments, the timing controller 54 may initialize memory 78 (block 132). To initialize the memory 78, the timing controller 54 may enable a control signal to force a node of the memory 78 to a low voltage value, such as through instruction to the row driver 60 or column driver 62. Taking FIG. 8 for example, to initialize the memory 78, the row driver 60 may enable a reset signal to reset a voltage value of a node of the memory 78 in response to receiving a control signal from the timing controller 54. Initializing the memory 78 may enable light-emitting circuitry of the sub-pixel 74 (e.g., LED 104) to emit until the comparator 120 outputs a control signal to stop light emission (e.g., in response to the gray level stored in memory being reached by the counter 108). In other words, for one or more sub-pixels 74 implementing a comparator 120, sub-pixels 74 may start light emission together at the same time but stop light emission at different times—where the respective duration of light emission corresponds to a target gray level for the respective sub-pixel 74.

The timing controller 54 may precharge a common output from the comparator 120 after initializing the memory 78 (block 134). The timing controller 54 may enable a precharge signal (e.g., via the row driver 60, via the column driver 62) to cause a voltage to boost circuitry of the sub-pixel 74, thereby improving responsiveness of the sub-pixel 74 to changes in output from the comparator 120. It should be appreciated that any suitable circuitry arrangement may be used to facilitate precharging the sub-pixel 74.

After precharging the comparator 120, the timing controller 54 may increment a count of the counter 108 (block 136). The timing controller 54 may increment the counter 108 by using the gray level clock 110. After incrementing the counter 108, the sub-pixel 74 may automatically determine if the count of the counter 108 is greater than or equal to a value represented by the image data 56A. This occurs since the individual bits of the count and the individual bits of image data 56A are respectively transmitted to the comparator 120. The comparator 120 may output a logical high value when none of the bits match or may output a logical low value when each of bits match or when a bit changes that would signify that the image data 56A has been exceeded by the count.

After incrementing the count of counting circuitry, the timing controller 54 may cause light emission based on the output from the comparator 120 (block 138). The value transmitted from the comparator 120 may activate or deactivate switching circuitry of the LED driver (e.g., switch 106) and the LED 104 responsible for emitting light.

The timing controller 54 may determine if the count of the counter 108 is a maximum count (block 140). The counter 108 may count from a minimum to a maximum value, for example, from 0 to 255. Thus, when a maximum value, or a maximum count, is reached by counting circuitry, the timing controller 54 may perform certain processing steps to restart the count. It is noted that in some embodiments the timing controller 54 may count down instead of counting up, and thus, the timing controller 54 may determine whether the minimum count has been reached.

In response to the maximum count not being reached, the timing controller 54 may continue to cause light emission from the sub-pixel 74 (block 138). However, in response to the maximum count being reached, the timing controller 54 may prepare for presentation of a next image frame (block 142). To do this, the timing controller 54 may prepare to receive new image data 56A corresponding to the target gray level of the sub-pixel 74 used to communicate the next image frame.

In some cases, the timing controller 54 may operate the sub-pixel 74 to emit light according to a binary order represented by the image data 56A. Sometimes the row driver 60 may rearrange bit order of the image data 56A to improve efficiency of driving of the sub-pixel 74, such as may occur when image data 56A is thermally encoded. For example, if the image data 56A equals 0010, the row driver 60 may operate according to image data equaling 1-0-0-0 such that the emission time for the "1" occurs first and is not emitted after the time period corresponding to "00." This rearranging may improve appearances of visual artifacts on a display 18 while still causing the same gray level indicated by "0010" to emit from the sub-pixel 74 (e.g., gray level=2) as opposed to the gray level represented by the reordered image data (e.g., gray level=8). When the row driver 60 reorders image data 56A it is noted that the relative emission periods for each bit may remain the same. For example, when data representing a gray level of 20 is reordered for efficient driving of the sub-pixel 74, the reordering does not result in a change in gray level for the image data 56A (e.g., pre-reordering gray level=20 and post-reordering gray level=20).

Figure 10:
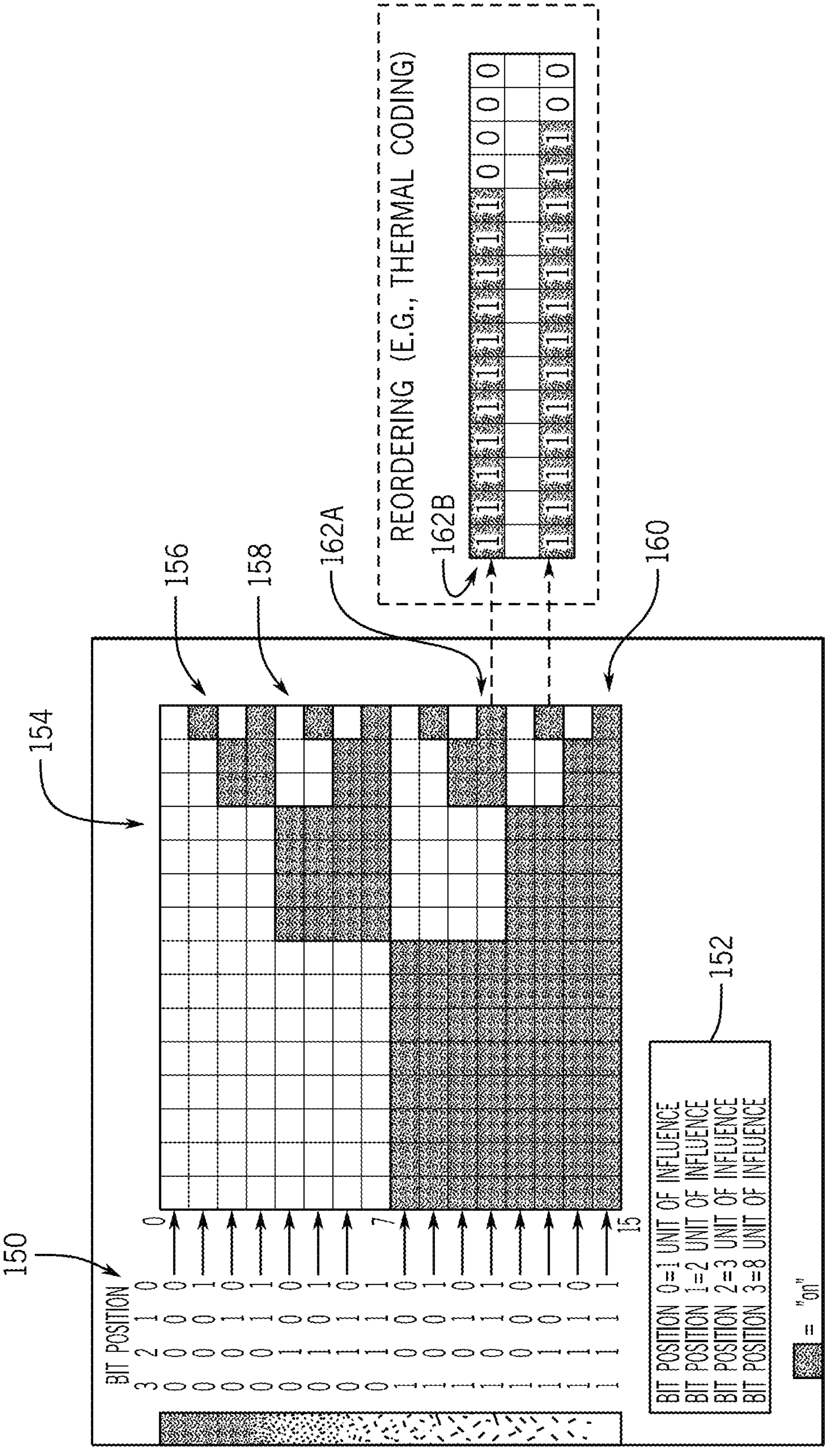
FIG. 10 is an illustration of example binary sequences adjacent to a representation of a relative weight for each bit in each binary sequence to help explain the single pulse width modulation scheme described with FIG. 8, in accordance with an embodiment.

FIG. 10 is an illustration of example binary sequences 150 adjacent to a representation of a relative weight for each bit in each binary sequence 150. Each of the binary sequences may at some point in operation of the display 18 correspond to image data 56A. Relative weights may be assigned to each bit position (e.g., summarized in table 152) of each of the binary sequences 150. Bit-plane illustration 154 may illustrate a relative effect of each bit point on an overall gray level when using bits to drive a sub-pixel 74 to emit light.

For example, bit position 0 may correspond to 1 relative unit of influence over light emission from the sub-pixel 74 (e.g., $2^0$=1) and bit position 3 may correspond to 8 units of influence (e.g., 23=8, 4 times the impact on overall gray level than bit position 0). For example, row 156 may correspond to binary sequence "0001," row 158 may correspond to binary sequence "0100," and row 160 may correspond to binary sequence "1111." The bit-plane illustration 154 visually shows a bit-plane representation of each binary combination of the binary sequences 150. In some cases, the respective binary sequence of the binary sequences 150 corresponding to the image data 56A may be used to drive the sub-pixel 74, such as when the respective binary sequence is stored in memory 78 as image data 56A of FIG. 8 (e.g., when the memory 78 stored 4 bits).

A respective binary sequence of the binary sequences 150 may be thermally coded to show how the binary sequence corresponds to a natural number representation of the number. Thermal coding may change a sequence 162A having a numerical value based in binary number into a sequence 162B having a numerical value based on a number of consecutive values (e.g., "1" or "0" values consecutive). In this example, the value of the sequence 162B may be interpreted as having a numerical value equaling "11" (e.g., eleven) since there are eleven consecutive "1"s after the thermal coding of the sequence 162A. To explain differently, sequence 162A corresponds to binary number "1011" which, when thermally coded, is represented by sequence 162B "111111111110000." FIG. 10 also shows another thermal coding example. The binary number "1101" may be thermally coded to equal "111111111111100."

As may be apparent from the bit-plane illustration 154, binary sequences 150 may be represented in the bit-plane representation according to a pattern. For example, a bit in the bit position 3 may change the gray level represented by the binary sequence from numbers 0-7 to a gray level representing the binary sequence for numbers 8-15. In this way, the bit in bit position 3 may be considered to have a relatively high influence on a perceived final value gray level of light emitted by the sub-pixel 74.

Figure 11A:
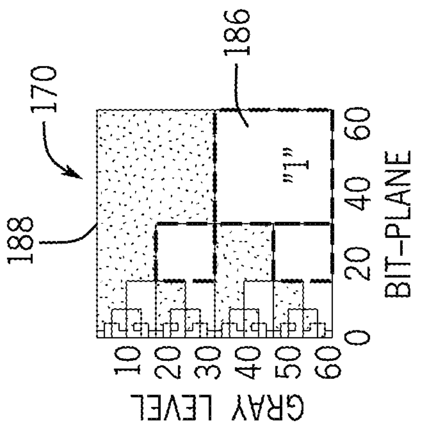
FIG. 11A is a bit-plane graph corresponding to no reordering implemented, in accordance with an embodiment.
Figure 11B:
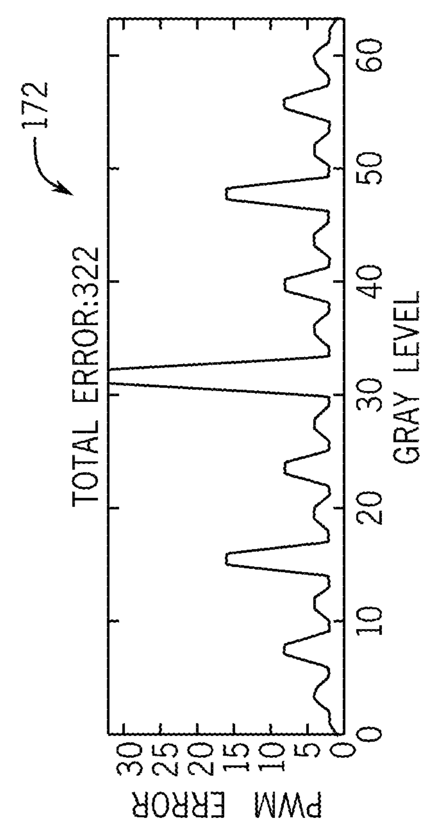
FIG. 11B is an error graph corresponding to no reordering implemented, in accordance with an embodiment.
Figure 11C:
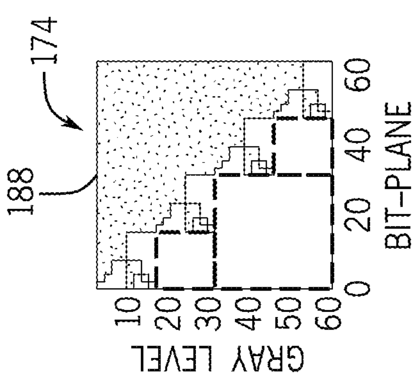
FIG. 11C is a bit-plane graph corresponding to two reorderings, in accordance with an embodiment.
Figure 11D:
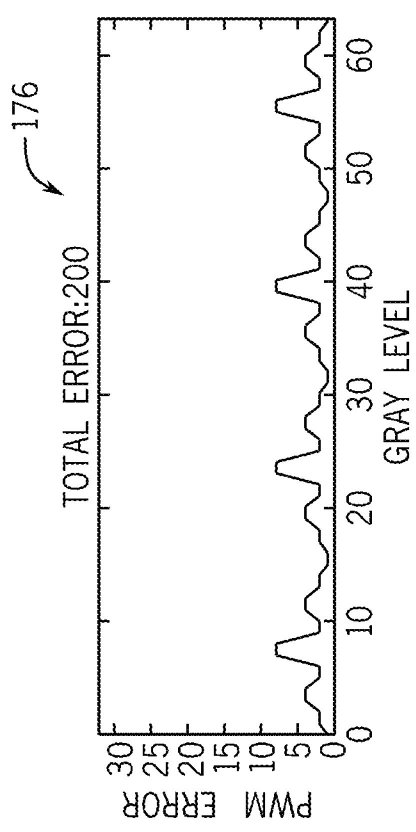
FIG. 11D is an error graph corresponding to two reorderings, in accordance with an embodiment.
Figure 11E:
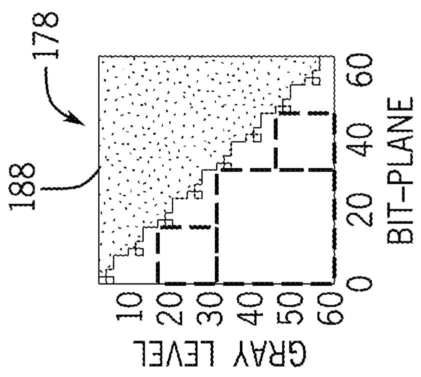
FIG. 11E is a bit-plane graph corresponding to three reorderings, in accordance with an embodiment.
Figure 11F:
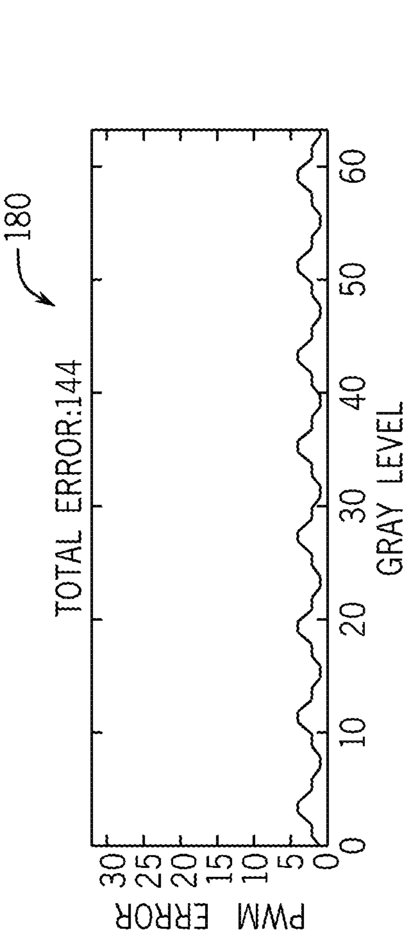
FIG. 11F is an error graph corresponding to three reorderings, in accordance with an embodiment.
Figure 11G:
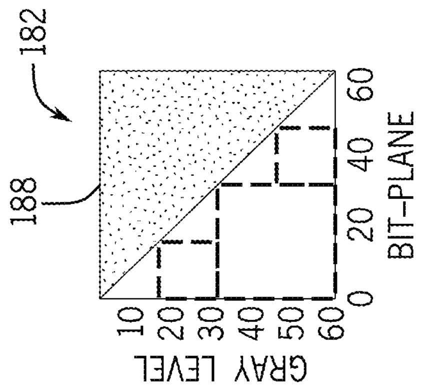
FIG. 11G is a bit-plane graph corresponding to an ideal case of reordering, in accordance with an embodiment.
Figure 11H:
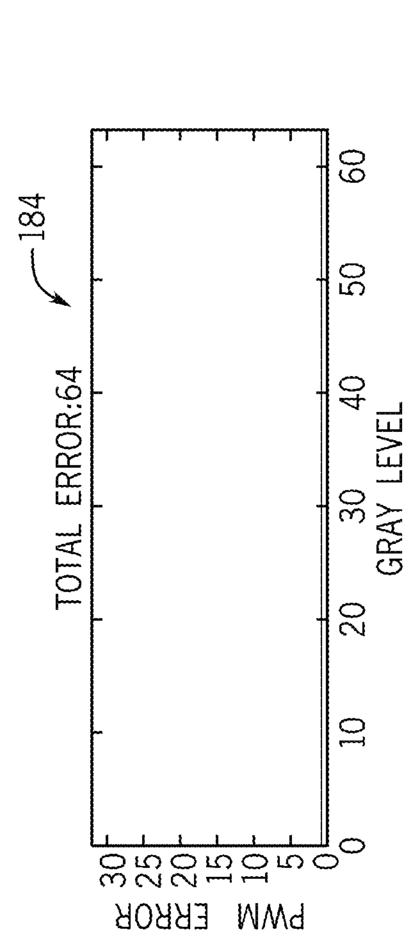
FIG. 11H is an error graph corresponding to an ideal case of reordering, in accordance with an embodiment.

Elaborating further on the bit-plane illustration 154, FIG. 11A shows a bit-plane graph 170, FIG. 11B shows an error graph 172, FIG. 11C shows a bit-plane graph 174, FIG. 11D shows an error graph 176, FIG. 11E shows a bit-plane graph 178, FIG. 11F shows an error graph 180, FIG. 11G shows a bit-plane graph 182, and FIG. 11H shows an error graph 184, where FIG. 11 as a whole illustrates the effects reordering on total error. FIG. 11A-FIG. 11H represent simulated performance of a display 18 implementing the emission scheme with and without reordering for a six-bit binary number representing a target gray level for a sub-pixel and/or a pixel.

The bit-plane graph 170 shows an original sequence of the emission scheme without any reordering for gray levels represented by six bits, where for all the bit-plane graphs 170, 174, 178, and 182 have a light portion 186 corresponding to light emission and a dark portion 188 corresponding to no light emission. In this first example, a sub-pixel 74 may be driven to emit light at each indicated light portion 186 and not driven to emit light at each indicated dark portion 188. Since a human eye may integrate light emitted over time, light emitted in a modulation, non-continuous manner may be perceived as smooth. However, since no re-ordering has occurred with the first bit-plane graph 170, light emission according to the indicated light portions 186 may be perceived as imperfect and as having visual artifacts, since sometimes the modulations are perceivable. The modulations may additionally or alternatively cause dynamic false contouring (DFC) artifacts, which may or may not worsen when an observer of the display 18 adjusts a viewing positioning (e.g., turns head, shifts body).

When sub-pixels 74 are operated to emit light following an emission scheme without reordering (e.g., according to bit-plane graph 170), total error counts are high (e.g., error count=322, errors perceivable as visual artifacts, such as DFC), as shown in error graph 172. It may be desired to lower the total error counts through reordering since these errors may manifest on an electronic screen of a display 18 as, for example, dynamic false contouring, color breakup, and/or flickering of light emitted from one or more pixels.

As reordering occurs and as the most significant bits are reordered to emit first to cause gray levels of the bit-plane graphs, as seen with bit-plane graph 174 and bit-plane graph 178, the bit-plane pattern trends towards looking like the ideal bit-plane shown in bit-plane graph 182. In addition, error decreases as reordering occurs as shown with error graph 172, error graph 176, error graph 180, and error graph 184. Perceived image quality may improve from decreasing error counts via the reordering of the bit-planes.

The ideal case (e.g., bit-plane graph 182) shows how the bit-plane graph 182 trends to a gradual bit-plane change as gray level increases and how the total error trends to a number of total states represented by the bit-plane (e.g., 6 bits corresponds to 64 total states, following the relationship: number of states=22, where z is the number of bits) through increasing a number of reorderings. Furthermore, it is noted that driving sub-pixels 74 of the display 18 using single pulse width modulation techniques may resemble the ideal case (e.g., bit-plane graph 182) described above, and thus may reduce occurrences of perceivable visual artifacts occurring when presenting image frames. It is noted that, the systems and methods described herein are described in terms of driving sub-pixels 74 using these single pulse width modulation techniques. However, it should be understood that using the allocated external memory in combination with the memory internal to the pixel may provide similar benefits to each driving technique. For example, some binary pulse width modulation display systems may benefit from partially driving sub-pixels from a combination of memory allocated to the sub-pixels.

Figure 12:
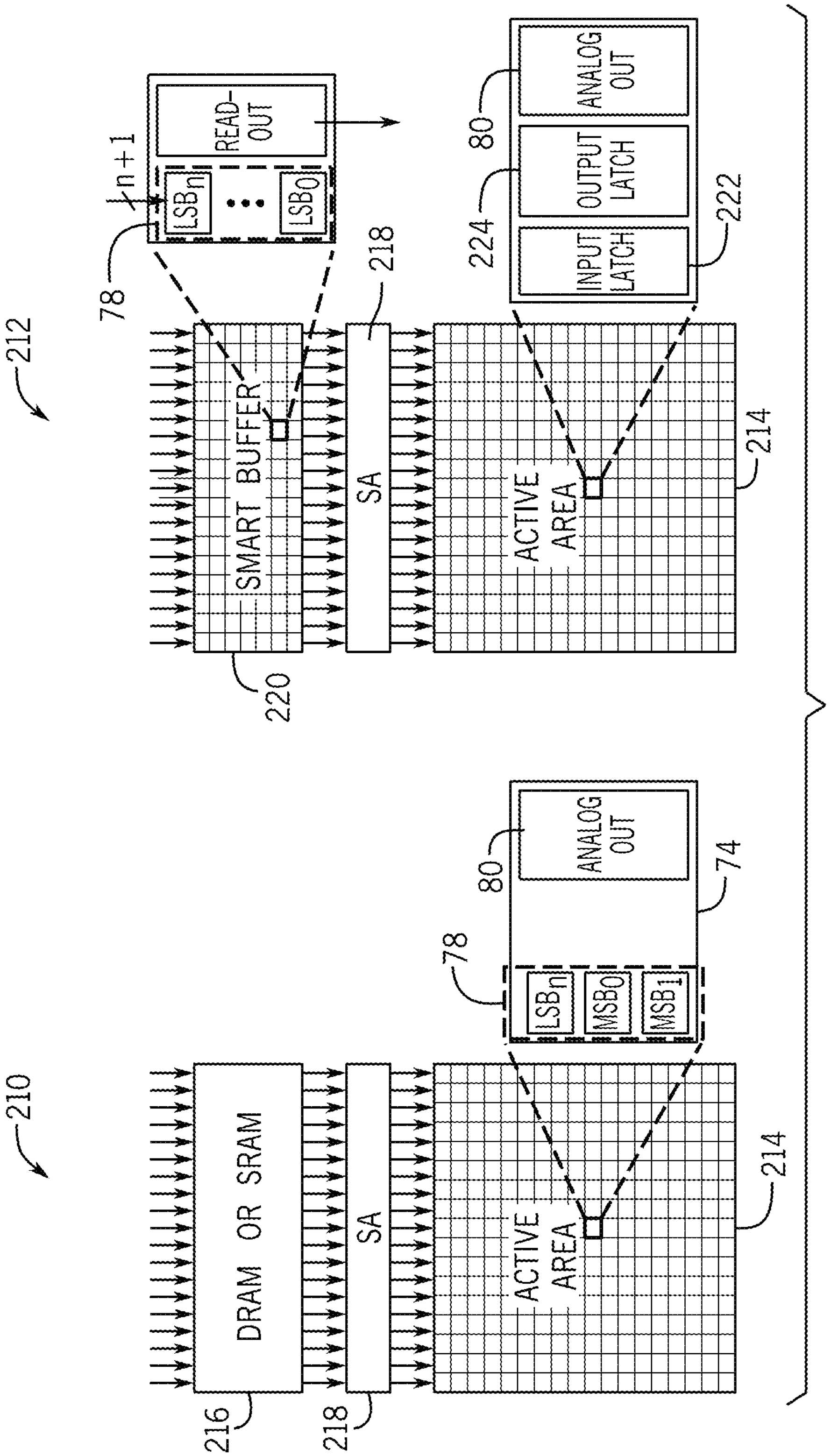
FIG. 12 is a block diagram comparing the display system of FIG. 5 with a first example display system having a smart buffer outside of an active area of an electronic display, in accordance with an embodiment.

To elaborate further on memory-in-pixel architectures, memory-in-pixel panels may implement memory within an active area and/or a smart buffer of the display 18. For example, FIG. 12 is a block diagram illustrating a memory-in-pixel architecture display 210 and a smart buffer architecture display 212. The memory-in-pixel architecture display 210 includes, as depicted, memory 78 in each sub-pixel 74 located in an active area 214 of the display 18, where the active area 214 includes light-emitting components of the display 18 and communicative couplings to support data transmission to the light-emitting components. In the memory-in-pixel architecture display 210, digital data may transmit from memory 216 to each respective sub-pixel 74 for localized buffering in the memory 78. In some embodiments, the digital data transmits from the memory 216 to a source area (SA) 218 before transmission into the memory 78 for localized buffering (e.g., buffering within the sub-pixel 74). However, memory substantially similar to the memory 78 may be included in a smart buffer 220 of the smart buffer architecture display 212 to eliminate, or at least reduce, a reliance on a frame buffer as well as remove the memory 78 from the active area 214. By moving the memory 78 into a smart buffer 220, the row driver 60 may use an input latch 222 and an output latch 224 to arbitrate light emission from each sub-pixel 74 via analog out circuitry, such as the driver (DRV) 80. Here, the smart buffer 220 may represent any suitable buffer memory disposed in an integrated circuit of the display 18 but outside of the active area of the display 18. It is noted that although not specifically depicted, readout circuitry may be included between the memory 78 and interface circuitry to enable transmission of signals from the memory 78 and/or to the memory 78.

Figure 13:
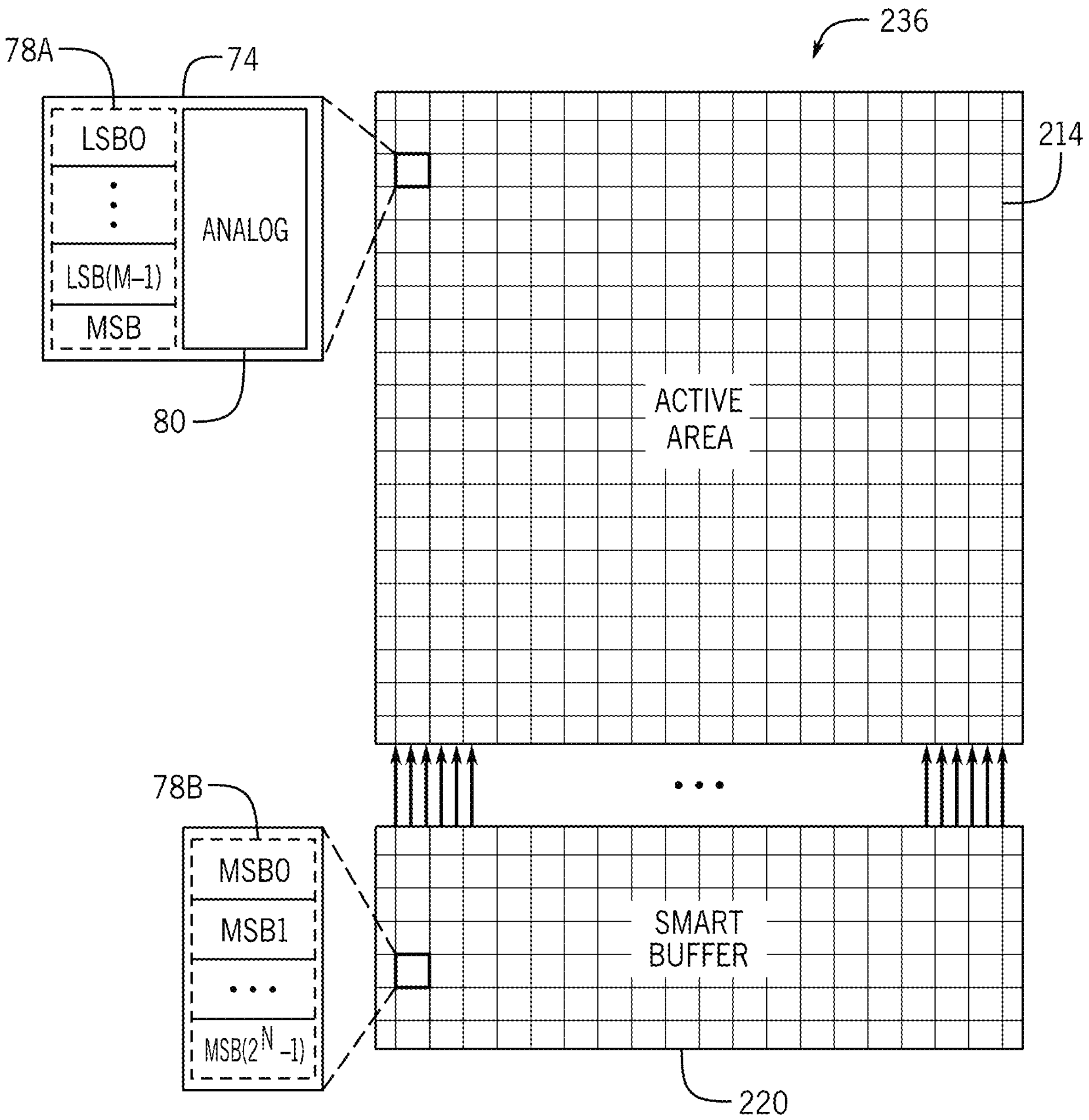
FIG. 13 is a block diagram of a second example display system having memory internal to the pixels of a panel and memory internal to a smart buffer but allocated to respective pixels of the panel, in accordance with an embodiment.
Figure 14:
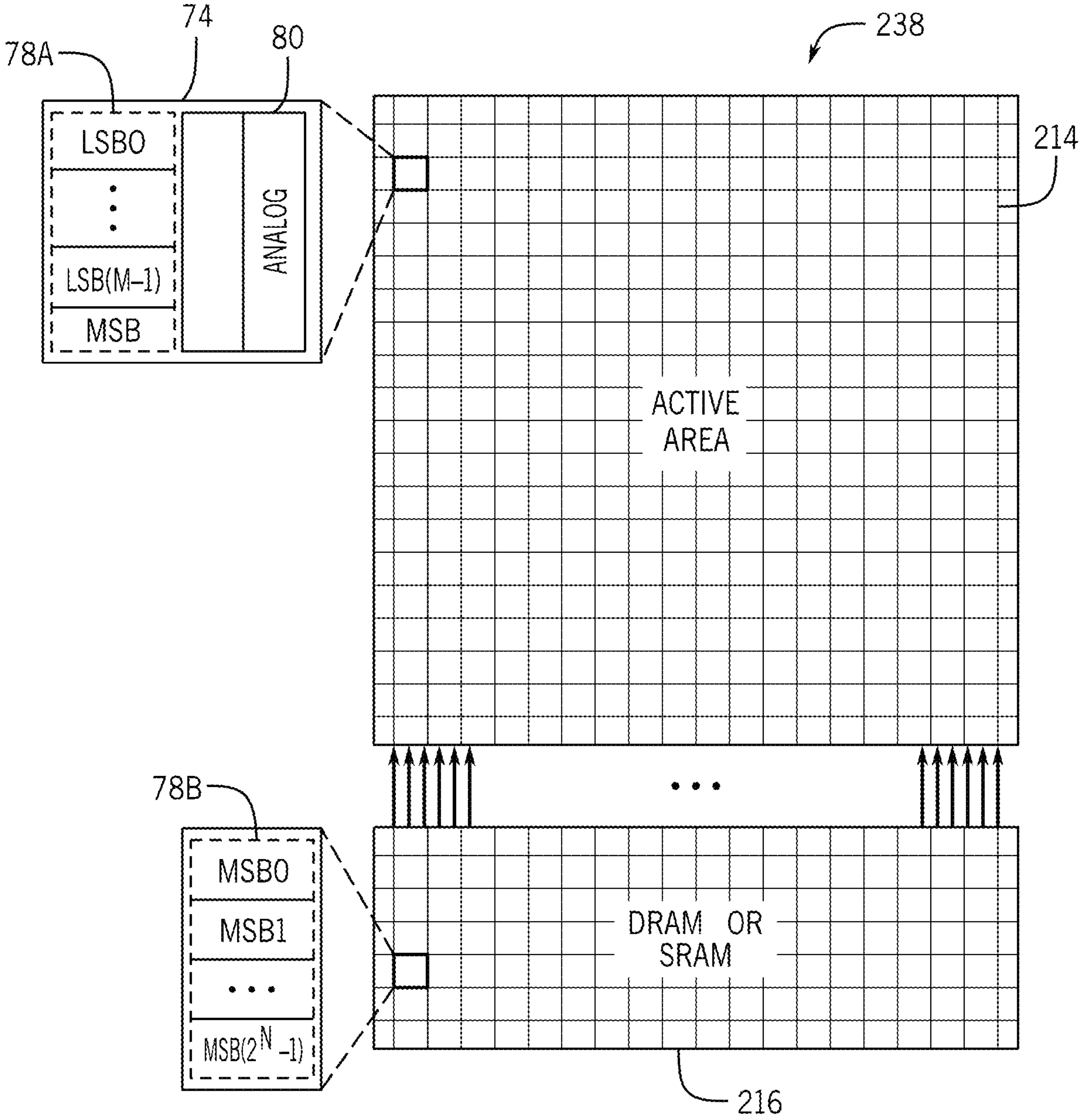
FIG. 14 is a block diagram of a third example display system having memory internal to the pixels of a panel and an external memory of the display system but allocated to respective pixels of the panel, in accordance with an embodiment.

Furthermore, in some cases, some of the memory 78 may be included in the sub-pixel 74 and some of the memory 78 may be included in the smart buffer 220. FIG. 13 is a block diagram illustrating another example memory-in-pixel architecture display 236. In the memory-in-pixel architecture display 236, the sub-pixel 74 include some of the total memory 78 (e.g., memory 78A) allocated to the sub-pixel 74 and the smart buffer 220 include the remaining memory 78 (e.g., memory 78B) allocated to the sub-pixel 74. It is noted that in these cases where the memory 78 is generally split into two portions (e.g., memory 78A and memory 78B), FIG. 8 may simplify what is included in the sub-pixel 74. For example, the memory 78A may be included in the sub-pixel 74 while the memory 78B may be disposed external to the sub-pixel 74, such as in the smart buffer 220 or an additional memory, as is shown in FIG. 14. Referring back to FIG. 8, for clarity's sake, the driver (DRV) 80 of the sub-pixel 74 may include the current source 102, the comparator 120, the switch 106, circuitry to transmit outputs from the memory 78A and/or the memory 78B to the sub-pixel 74 for processing, or the like. In some cases, the comparator 120 may also be disposed external to the sub-pixel 74, and thus be disposed in the smart buffer 220, the row driver 60, the column driver 62, the timing controller 54, or the like.

FIG. 14 is a block diagram illustrating yet another example of a memory-in-pixel architecture display 238. In the memory-in-pixel architecture display 238, the sub-pixel 74 include some of the total memory 78 (e.g., memory 78A) allocated to the sub-pixel 74 and the memory 216 (e.g., dynamic random-access memory (DRAM), static random-access memory (SRAM)) include the remaining memory 78 (e.g., memory 78B) allocated to the sub-pixel 74. It is noted that, although not particularly depicted in FIG. 13 and FIG. 14, the source area 218 may additionally be coupled between the smart buffer 220 and the active area 214 and/or between the memory 216 and the active area 214, similar to as shown in FIG. 12.

The smart buffer 220 and/or a controller associated with the memory 216 may perform thermal coding operations on received image data 56A before sending a portion of image data 56A to the memory 78A. The thermal coding operations may help convert a target gray level into actionable operations and/or generate control signals to time activations of certain switches. In some cases, a switch controlling which one of the memory 78A or the memory 78B impacts light emission of the sub-pixel 74 may receive a control signal generated based on data of the memory 78B that has been thermally coded. For example, when the memory 78B stores the most significant bit of "1010," where the most significant bit equals numeral 7 when counting from numeral 0 as the first binary state permitted by a 4 bit binary sequence, the switch may be controlled by a control signal equal to "1111 1110 0000 0000." The control signal may toggle at a substantially similar time as when the counter is expected to reach numeral 7.

Figure 15:
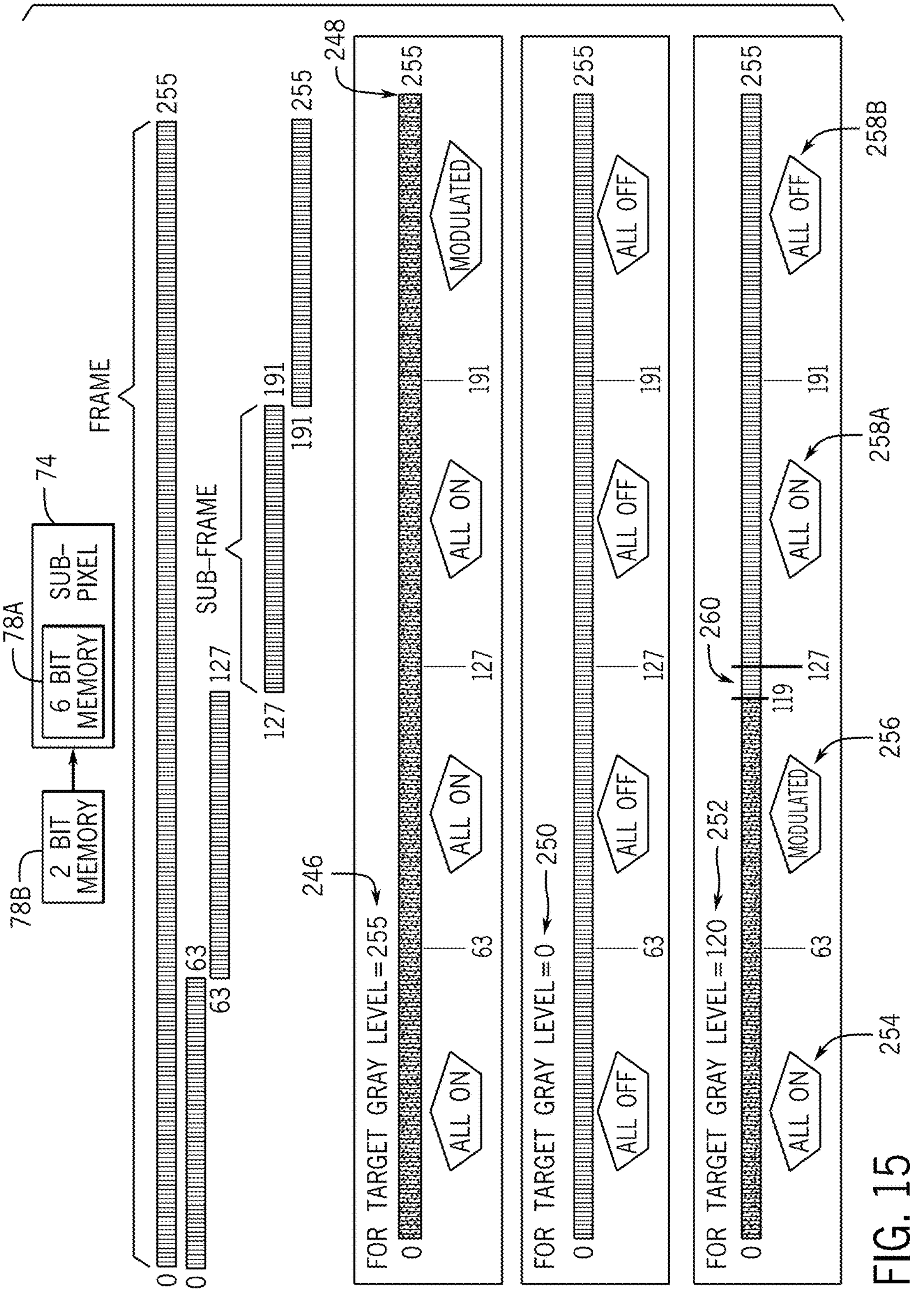
FIG. 15 is an illustration emphasizing how a controller may use a target gray level to drive the pixel of FIG. 8, in accordance with an embodiment.

To elaborate, FIG. 15 is an illustration emphasizing how the electronic device 10 (e.g., a controller or processor of the electronic device 10) may convert a target gray level into operations. For example, the electronic device 10 may drive the sub-pixels 74 based on control signals generated by the timing controller 54, the row driver 60, the column driver 62, the smart buffer 220, a controller of the memory 216, the processing core complex 12, or the like. As described herein, the timing controller 54 is described as directing the conversion of the target grey level into actionable operations but it should be understood that any suitable processing circuitry of the electronic device 10 may perform some or all of the conversion operations. In some cases, thermal coding operations may help convert the target gray level into control signals and/or actionable operations for the sub-pixel 74, such as to identify how many sub-frames are to be used to cause the sub-pixel 74 to emit light at a target gray level.

The timing controller 54 may use an all on operation that overrides the memory 78A and causes the sub-pixel 74 to emit light for an entire sub-frame duration regardless of the data stored in the memory 78A (e.g., such as according to data stored in memory 78B), an all off operation that overrides the memory 78A and causes the sub-pixel 74 to not emit light for an entire sub-frame duration regardless of the data stored in the memory 78A, and/or a modulated operation that does not override the memory 78A and causes the sub-pixel 74 to emit light according to the data stored in the memory 78A as a way to cause the sub-pixel 74 to emit light at a target gray level. Thus, the timing controller 54 may control light emission from the sub-pixel 74 by sometimes overriding the memory 78A and by sometimes driving the sub-pixel 74 from the memory 78A. This dual driving (e.g., dual-control) of the sub-pixel 74 may improve efficiencies associated with presenting and/or processing image data for an incoming image frame. The sub-pixel 74 may thus be driven to emit light according to (e.g., based on) a first digital data signal (e.g., data stored in memory 78B) for a first duration of time and a second digital data signal (e.g., data stored in memory 78A) for a second duration of time to emit light at a target gray level.

To control emission of light from the sub-pixel 74, each image frame display duration (e.g., each frame duration, each frame) may thought of as divided into sub-frame display durations. A number of sub-frames used to form a complete image frame display duration may depend on particular configurations of the memory 78, and thus binary arithmetic associated with the configurations of the memory 78. For example, the memory 78 may be split into the memory 78A and the memory 78B. A ratio between the size of memory 78A depth and total size of the memory 78 may define the number of sub-frames. For the depicted example, the total size of the memory 78 corresponds to 256 bits (28=256 total bits=0-255) and the size of the memory 78A corresponds to 64 bits (e.g., 26=64 total bits=0-63). Therefore, four sub-frames may equal one frame (e.g., 256/64−4) and each sub-frame is to emit a quarter of the target gray level assigned to the sub-pixel. It is noted that the durations of each respective sub-frames may correspond to a duration of time used by the counter 108 to increment from count=0 to count=$2^M$ (where $2^M$ represents a number of bits represented by data stored in memory 78A), as will be appreciated.

To help elaborate, the timing controller 54 may receive a binary sequence for a target gray level equaling 255 (e.g., arrow 246), where 255/255 visualized by natural number representation 248. In this way, the timing controller 54 may drive the sub-pixel 74 from the memory 78B, causing a 100% light emission (e.g., all on operation) for three sub-frames, and may drive the sub-pixel from the memory 78A causing a modulated light emission for one sub-frame (e.g., modulated but causes the sub-pixel 74 to emit light similar to the all-on operation). For the example where the target gray level equals 0 (e.g., arrow 250), the timing controller 54 may drive the sub-pixel 74 from the memory 78B and cause a 0% light emission (e.g., all off operation) for each sub-frame to convey the target gray level of 0.

Furthermore, for the example where the target gray level equals 120 (e.g., arrow 252), the timing controller 54 may drive the sub-pixel from the memory 78B for the first sub-frame for an all on operation (e.g., arrow 254) to emit light at a gray level substantially similar or equal to 63/63, drive the sub-pixel from the memory 78A for the second sub-frame for a modulation operation (e.g., arrow 256) to emit light at a gray level substantially similar or equal to 55/63, drive the sub-pixel from the memory 78B for the third sub-frame and the fourth sub-frame for an all off operation (e.g., arrow 258A, arrow 258B) to emit light at a gray level substantially similar or equal to 0/63 for two sub-frames. Thus, when the light emission over the four sub-frames is perceived by the operator of the display 18, the sub-pixel 74 is perceived as emitting light according to the target gray level of 119 (e.g., 119/2556 visualized by natural number representation 260).

Each sub-frame, then, may be assigned an emission operation by the timing controller 54 for each sub-pixel 74. Sometimes, the sub-pixel 74 is instructed to emit light regardless of data stored in the memory 78A (e.g., all on operation, all off operation), while sometimes the sub-pixel 74 is instructed to emit light according to data stored in the memory 78A. For example, the modulation operation may permit the sub-pixel 74 to emit light according to data stored in the memory 78A (e.g., binary data).

Data stored in the memory 78B may correspond to relatively more significant bit positions than the bit positions represented by data stored in the memory 78A, thus enabling the memory 78B to drive contiguous light emission or unmodulated light emission (of no light or unmodulated light). In this way, while the sub-pixel 74 is building up to emit at the target gray level, the sub-pixel 74 may be driven using more significant bits that have more of an influence on a final gray level without concern for the lesser significant bits. This emission may continue until the time is reached to use the less significant bits in the emission of light to fine tune a total amount of light emitted to be perceived as the target gray level.

Figure 16:
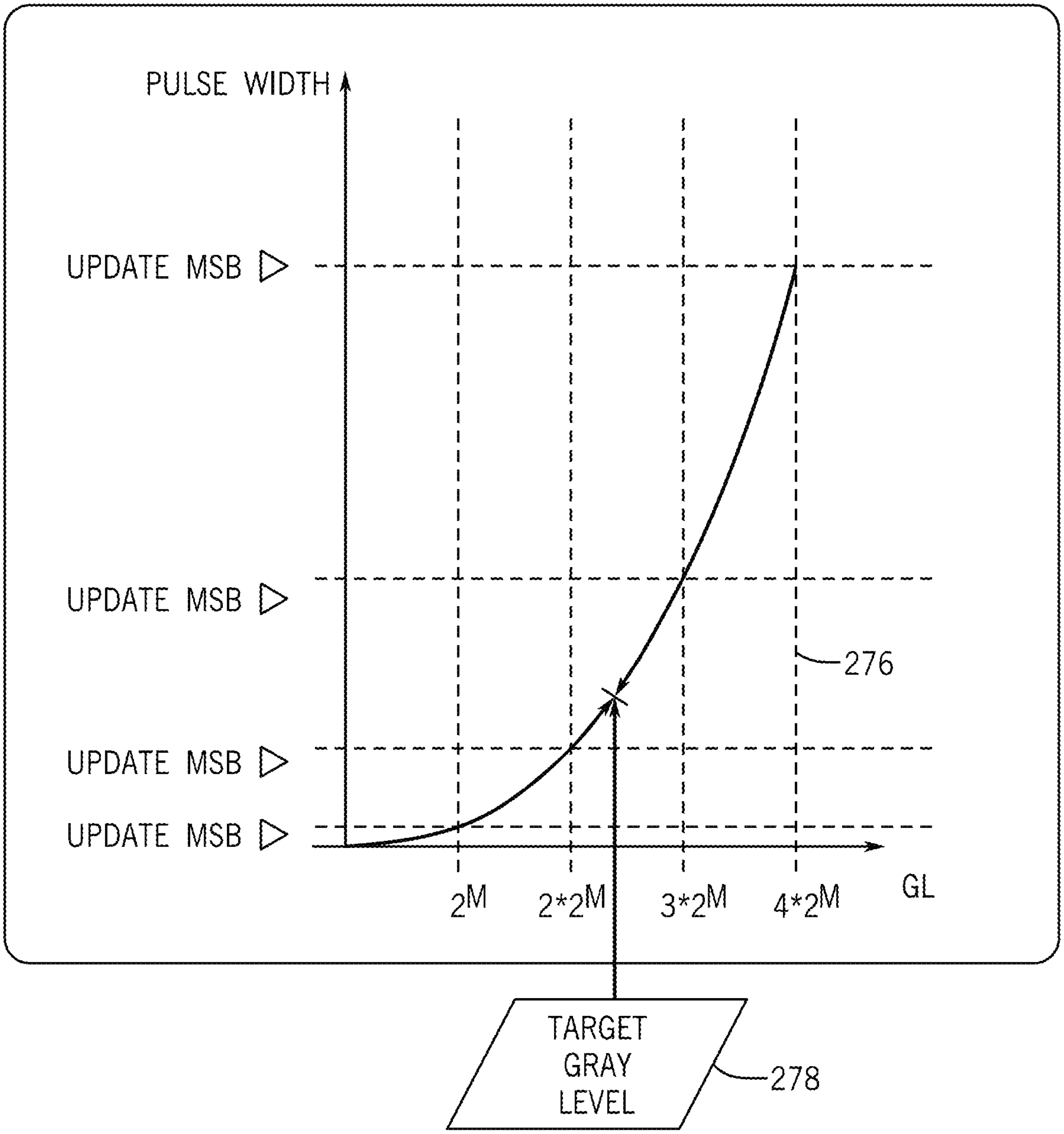
FIG. 16 is a plot illustrating a relationship between gray levels and pulse width control operations, in accordance with an embodiment.

FIG. 16 is a plot illustrating a gamma relationship between gray levels (e.g., x-axis) and pulse width control operations (e.g., y-axis). Dotted lines 276 illustrate sub-frames and how the binary data ranges supported by the memory 78 may conform to dual-memory driving techniques. Each sub-frame may correspond to a $2^M$ range of gray levels. In this way, the gray levels in the first sub-frame may correspond to gray levels between 0 and $2^M$−1, the second sub-frame may correspond to a number between $2^M$- and $2*2^M$−1, the third sub-frame may correspond to a number between $2*2^M$ and $3*2^M$−1, and the fourth sub-frame may correspond to a number between $3*2^M$ and $4*2^M$−1. When driving a sub-pixel 74 to emit light at a target gray level 278, the sub-pixel 74 may be operated to emit unmodulated light during the first sub-frame, operated to emit modulation light during the second sub-frame, and operated to emit no light during the third sub-frame and fourth sub-frame.

The most significant bit controlling modulation operations of the sub-pixel 74 may be updated between sub-frames, such as in response to a direct control signal from the timing controller 54, row driver 60, column driver 62, or the like, and/or in response to a counter incrementing through a binary counting sequence until equaling the target gray level. In this way, the bit controlling whether the sub-pixel 74 emits unmodulated light, emits no light, or emits modulated light, may be updated between sub-frames. Updating the bit between sub-frames may enable the change of emission behavior from the sub-pixel 74. It is noted that, in some cases, the display 18 may be a linear display, which may change the relationship between gray levels and pulse width control operations (e.g., where pulse widths used to control light emission do not necessarily exponentially increase overtime and may increase at a constant rate as gray levels increase).

Figure 17:
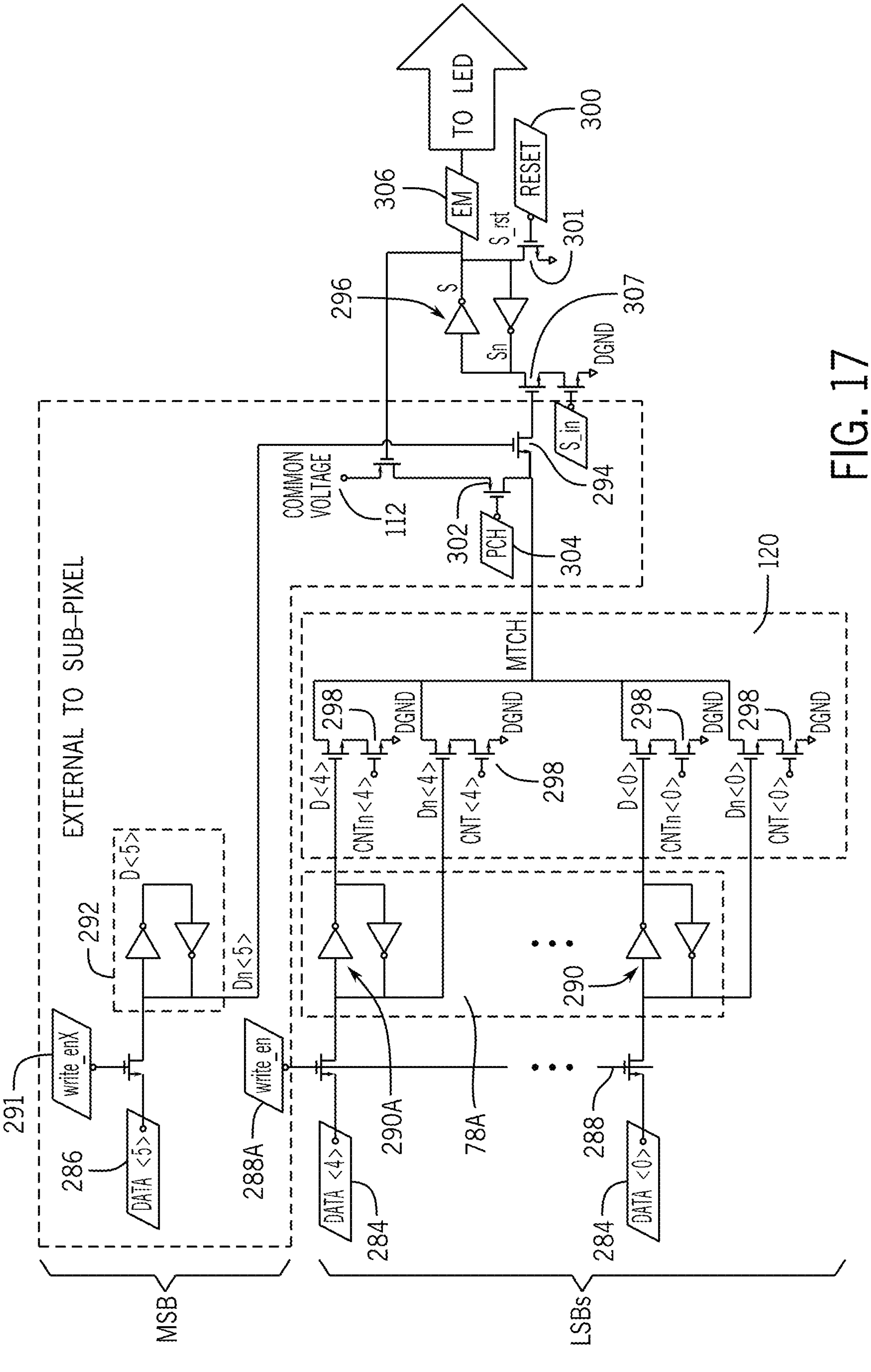
FIG. 17 is a circuit diagram of an example pixel of FIG. 8, in accordance with an embodiment.

FIG. 17 is a circuit diagram of a sub-pixel 74 that includes memory-in-pixel circuitry. As described at least in reference to FIG. 8, using memory-in-pixel techniques and a comparator 120 may enable a row driver to create a single pulse width modulation emission scheme. Accordingly, an example of the sub-pixel 74 including the comparator 120, memory 78A, and memory 78B is shown in FIG. 17. It should be appreciated that the sub-pixel 74 is intended to be illustrative and not limiting. For example, while the comparator 120 is shown as being coupled to LED driver circuitry and to light-emitting circuitry of the sub-pixel 74, the comparator 120 may couple to any suitable light-emitting circuitry and/or driving circuitry.

In the depicted sub-pixel 74, image data 56A is used to generate data 284 to be stored in the memory 78A and data 286 to be stored in the memory 78A. Writing data 284 into the memory 78 may involve the row driver 60 enabling a control signal 288 (e.g., write_en control signal) to cause transmission of the data 284 into inverter pairs 290. In some embodiments, the row driver 60 operates in tandem with the column driver 62 to cause parallel transmission of all bits associated with the data 284 into the inverter pairs 290 by enabling control signals 288 at the same time. Additionally or alternatively, the row driver 60 may cause bitwise transmission of bits associated with the data 284 through selectively enabling control signals 288, for example, loading a bit into inverter pair 290A by selectively enabling control signal 288A to cause transmission of the first bit of the data 284.

The data 286 stored in inverter pair 292 may correspond to a control signal generated by the row driver 60, column driver 62, timing controller 54, or the like to cause the sub-pixel 74 to emit light according to an all on operation. Additionally or alternatively, the data 286 stored in the inverter pair 292 may correspond to a compare result (e.g., a comparison result).

The row driver 60, column driver 62, timing controller 54, or the like, may generate the compare result by comparing most significant bits stored in the memory 78B to corresponding most significant bits of a present count of the counter 108 (e.g., a portion of the present count). While waiting for most significant bits stored in memory 78B to match the corresponding most significant bits of a current state of the count, the sub-pixel 74 to emit light according to an all on operation since light emission is performed regardless of bit values stored in memory 78A. When the most significant bits stored in memory 78B match the corresponding most significant bits of the count, the compare result may toggle and cause the after-toggle value to be stored in the inverter pair 292. In some cases, the compare result stored in the inverter pair 292 may equal a logical high value (e.g., a voltage value interpreted as a logic high value by circuitry of the electronic device 10). The compare result may be applied to a switch 294 and cause the switch 294 to decouple the comparator 120 from the inverter pair 296 in response to the compare result having a logic high value after the matching.

Once the data 284 is stored in the inverter pairs 290, and once the data 286 stored in the inverter pair 292 permits modulated driving of the sub-pixel 74 (e.g., a match has occurred and the data 286 resulting a comparison result indicating that the count at least matches the corresponding bits of the image data 56A), light emission may continue according to a modulated operation. During a modulated output, the comparator 120 uses the stored bits of data 284 and count bits (e.g., CNT) received at switches 298 (e.g., transistors) from counter 108 indicative of the present count to perform a comparison between the two sets of bits.

As a reminder, in a single pulse width modulation emission scheme, the counter 108 may increments up to a maximum gray level in response to a transition of a clocking signal, like a gray level clock 110, where light emission occurs from the sub-pixel 74 until the counter 108 counts up to a number equaling and/or exceeding a number represented by stored data 284. The counter 108 may include nodes, where signals of the nodes may transmit at values able to be interpreted by circuitry as binary numbers of a count. For example, when the count is 1 from 15, the counter 108 may generate signals that represent "0001" since the maximum number represented by 4 bits is 15. Each of the switches 298 may receive either the signal representative of the count or a signal represented of an opposite count (e.g., CNTn<0:4>, inverse count). When each signal representing the count matches each signal representing the data 284 (e.g., when each bit matches each bit), the comparator 120 may output a logical high signal (e.g., MTCH=1). When the count does not match data 284, the comparator 120 may output a logical low signal (e.g., MTCH=0) since at least one of the combinations of the signals may cause at least one of the switches 298 to couple to ground (e.g., a logic low reference voltage, a system low voltage, voltage equal to 0 volts, first reference voltage 114) without also coupling a logical high output from a corresponding of the inverter pairs 290 to the switch 294. In this way, the comparator 120 performs a compression of all of the bits of data 284 into a single bit indicative of if the data 284 is the same as the count transmitted from the counter 108. Thus, the comparator 120 performs a bitwise exclusive not- or function (XNOR) compression to a single bit, where an output from the comparator 120 is a logical low (e.g., "0") value unless every bit matches.

The output from the comparator 120 may be stored in inverter pair 296. The inverter pair 296 may retain the value until the row driver 60 resets a voltage stored by the inverter pair 296 using a reset signal 300. The reset signal 300 may activate a switch 301 (e.g., initialization transistor). When the switch 301 is "on" (e.g., activated), the inverter pair 296 may couple to ground.

Furthermore, a switch 302 may be included in a sub-pixel 74 to provide power-saving benefits from precharging a common output node of the comparator 120 (e.g., MTCH) thereby making the circuitry more responsive to changes in the output from the comparator 120. Precharging the common output node may involve the timing controller 54 and/or the row driver 60 generating and transmitting a precharge signal 304 (PCH) to cause the switch 294 to couple the common output node to a system logic high reference voltage. Precharging one or more portions of the sub-pixel 74 prior to driving of the sub-pixel 74 may permit lower changes in voltages to change an operation of the sub-pixel 74, such as by bringing voltage levels of the components closer to the voltage level separating logic low from logic high in the system. It is noted that the output from the depicted circuitry is output as a emission control (EM) signal 306 that drives emission from the LED 104 of the sub-pixel 74 until the output from the comparator 120 stops the emission (e.g., MTCH=1). The inverter pair 296 may receive a value for storage in response to a switch 307 being activated, thereby completing an electrical path to the inverter pair 296. Thus, the timing controller 54 may drive the sub-pixel 74 to determine whether the count of the counter 108 matches the image data 56A before activating the switch 307 to lock the result of the determination (e.g., comparison) in circuitry of the inverter pair 296.

It should be appreciated that a variety of valid embodiments may apply described memory-in-pixel techniques, and thus, in some embodiments, counting circuitry may decrement. In this way, the comparator 120 may output a logical low value if every bit matches and/or the switch 302 may be excluded from the sub-pixel 74.

Figure 18:
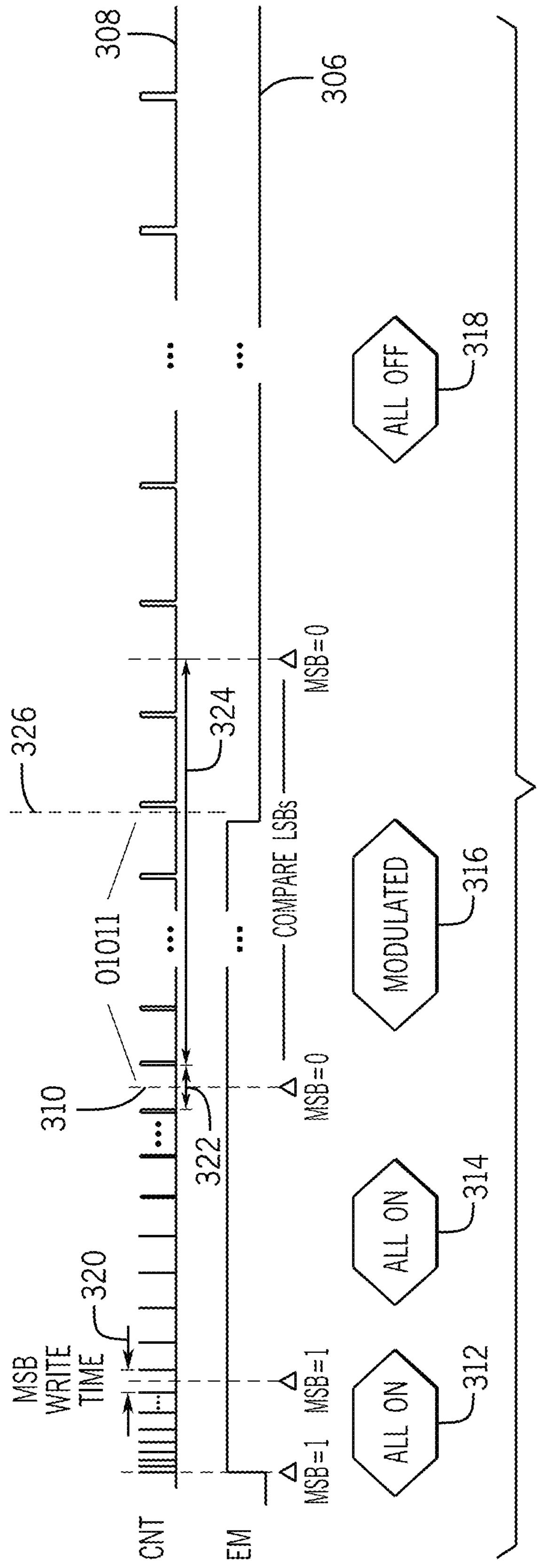
FIG. 18 is a timing diagram comparing the changing of a count to a state of an emission control signal, in accordance with an embodiment.

To explain operation further, FIG. 18 is a timing diagram comparing the changing of a count 308 of the counter 108 to the state of the EM signal 306. The gray level clock 110 may be monotonically increasing, thereby causing the increasing duration of time between changes in the count 308. Durations of time corresponding to each sub-frame are delineated via lines similar to line 310. In this way, the first sub-frame of this example corresponds to an all on operation (e.g., symbol 312), the second sub-frame of this example corresponds to an all on operation (e.g., symbol 314), the third sub-frame of this example corresponds to an all on operation (e.g., symbol 316), and the fourth sub-frame of this example corresponds to an all on operation (e.g., symbol 318).

Between the first sub-frame and the second sub-frame, such as during a designated write time period 320 between transitions in the count 308 (and thus also between transitions in the gray level clock 110), the bits stored in memory 78B (e.g., most significant bits (MSBs)) may not be updated, and thus continue to drive the sub-pixel 74 from the memory 78B. Between the second sub-frame and the third sub-frame (e.g., during the write time duration 322), the memory 78B may update to store data equal to 0. This switches which memory drives the sub-pixel 74 from the memory 78B to the memory 78A. Thus, during the third sub-frame (e.g., sub-frame duration 324), the memory 78A drives the sub-pixel 74 to emit light. The sub-pixel 74 emits light according to a modulated operation since the light emission is anticipated to stop at some time during the third sub-frame duration 324. In this case, light emission stopped at time 326, where a total amount of light emitted by the sub-pixel 74 leading up to the time 326 is perceived as the target gray level or substantially similar to the target gray level.

Figure 19:
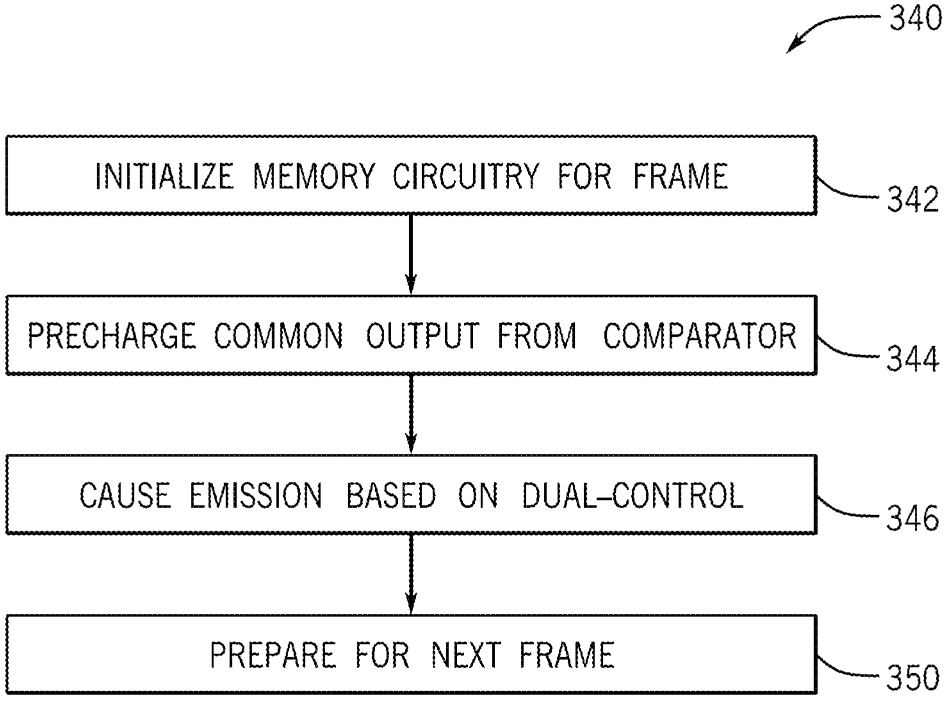
FIG. 19 is a process for operating the pixel of FIG. 17, in accordance with an embodiment.

FIG. 19 illustrates a process 340 for operating the sub-pixel 74 according to dual-control driving schemes. Generally, the process 340 includes initializing memory circuitry for a present frame (e.g., frame) (block 342), precharging common output from comparator (block 344), causing emission based on dual-control operations (block 346), and preparing for a next frame (block 350). In some embodiments, the process 340 may be performed at least in part by executing instructions stored in a tangible, non-transitory, computer-readable medium, such as the storage device 14, using processing circuitry, such as the processing core complex 12. Additionally or alternatively, the process 340 may be implemented at least in part based on circuit connections formed in display controlling circuitry, such as a row driver 60, a column driver 62, and/or a timing controller 54. As described herein, the process 340 is performed by the timing controller 54.

Thus, in some embodiments, the timing controller 54 may initialize memory 78 to prepare to present a frame (e.g., current frame, present frame to be presented) (block 342). To initialize the memory 78, the timing controller 54 may use the row driver 60 and/or the column driver 62 to generate a control signal to force one or more nodes of the memory 78 to a low voltage value to reset and/or clear the memory 78. The timing controller 54 may enable the reset signal 300 (e.g., via the row driver 60) to reset a voltage value stored in the inverter pair 296. In some cases, the memory 78 is initialized by the timing controller 54 instructing the writing of the image data 56A to the memory 78. Initializing the memory 78 may enable light-emitting circuitry of the sub-pixel 74 (e.g., LED 104) to emit until the comparator 120 outputs a control signal to stop light emission (e.g., in response to the gray level stored in memory being reached by the counter 108). In other words, for one or more sub-pixels 74 implementing a comparator 120, sub-pixels 74 may start light emission together at the same time but stop light emission at different times, where the respective duration of light emission corresponds to a target gray level for the respective sub-pixel 74.

The row driver 60 may precharge the sub-pixel 74 after initializing the memory 78 (block 344). To precharge the sub-pixel 74, the row driver 60 may enable a precharge signal to cause a voltage to boost a voltage of a node coupling an output from the comparator 120 to an input of the inverter pair 296. Boosting the voltage of the node may cause the sub-pixel 74 to be more responsive to changes in output from the comparator 120.

After precharging one or more portions of the sub-pixel 74, the timing controller 54 cause light emission from the sub-pixel 74 based on dual-control operations (block 346). For example, the timing controller 54 may cause a count of counter 108 to change (e.g., increment, decrement). The timing controller 54 may increment the counter 108 by using the gray level clock 110, such that the count represented by outputs from the counter 108 change in response to a rising or falling edge of the gray level clock 110. The emission of light from the LED 104 may stop once the count of the counter 108 exceeds the image data 56A. After changing the count of counter 108, the sub-pixel 74 may automatically determine if the count of the counter 108 is greater than or equal to a value represented by the image data 56A. This occurs since a subset of bits of the count and a subset of bits of the image data 56A are transmitted to the comparator 120 for comparison. The comparator 120 may output a logical high value when none of the bits match or may output a logical low value when each of bits match or when a bit changes that would signify that the image data 56A has been exceeded by the count. This output from the comparator 120 may stop light emission from the sub-pixel 74.

Once the sub-pixel 74 emits light at the target gray level, or emits an amount of light substantially similar to the target gray level, the timing controller 54 may prepare to present a next frame, or a portion of a next frame (as may be the case in partial frame presentation operations) (block 350). In this way, the timing controller 54 may repeat operations of the process 340 to present a subsequent frame, where the subsequent frame may include one or more repeated gray levels from the initial frame. Data stored in the memory 78 may not be changed or overwritten when gray levels assigned to the sub-pixel 74 does not change between frames. In some cases, each sub-pixel 74 receives the image data 56A for the subsequent frame regardless of whether a portion of the initial frame repeats in the subsequent frame, or whether a portion of the subsequent frame is to be presented using sub-pixels 74 emitting light at a repeated gray level relative to the initial frame.

Figure 20:
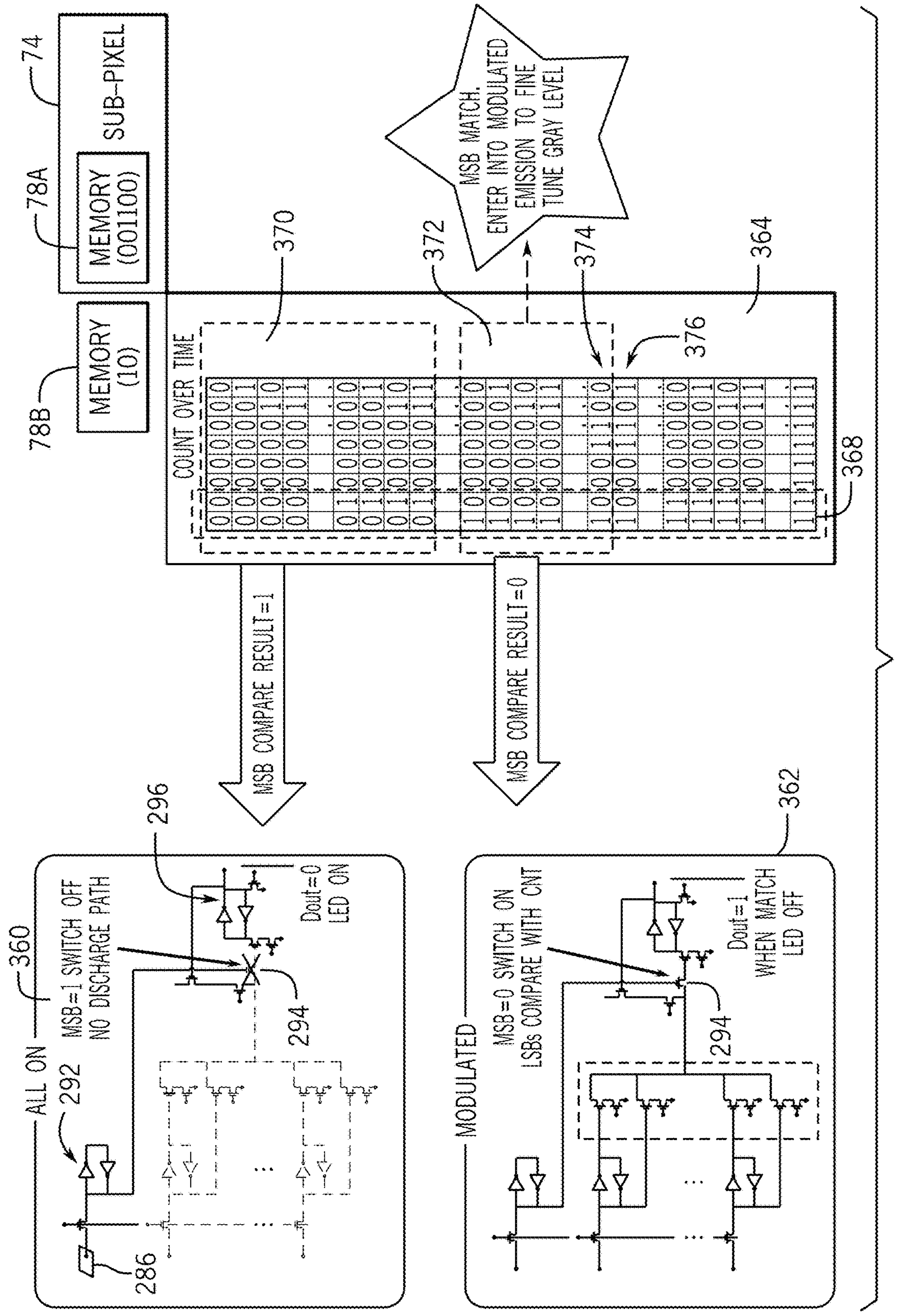
FIG. 20 is an illustration depicting an all on operation of the pixel of FIG. 17 and a modulated operation of the pixel of FIG. 17, in accordance with an embodiment.
Figure 21:
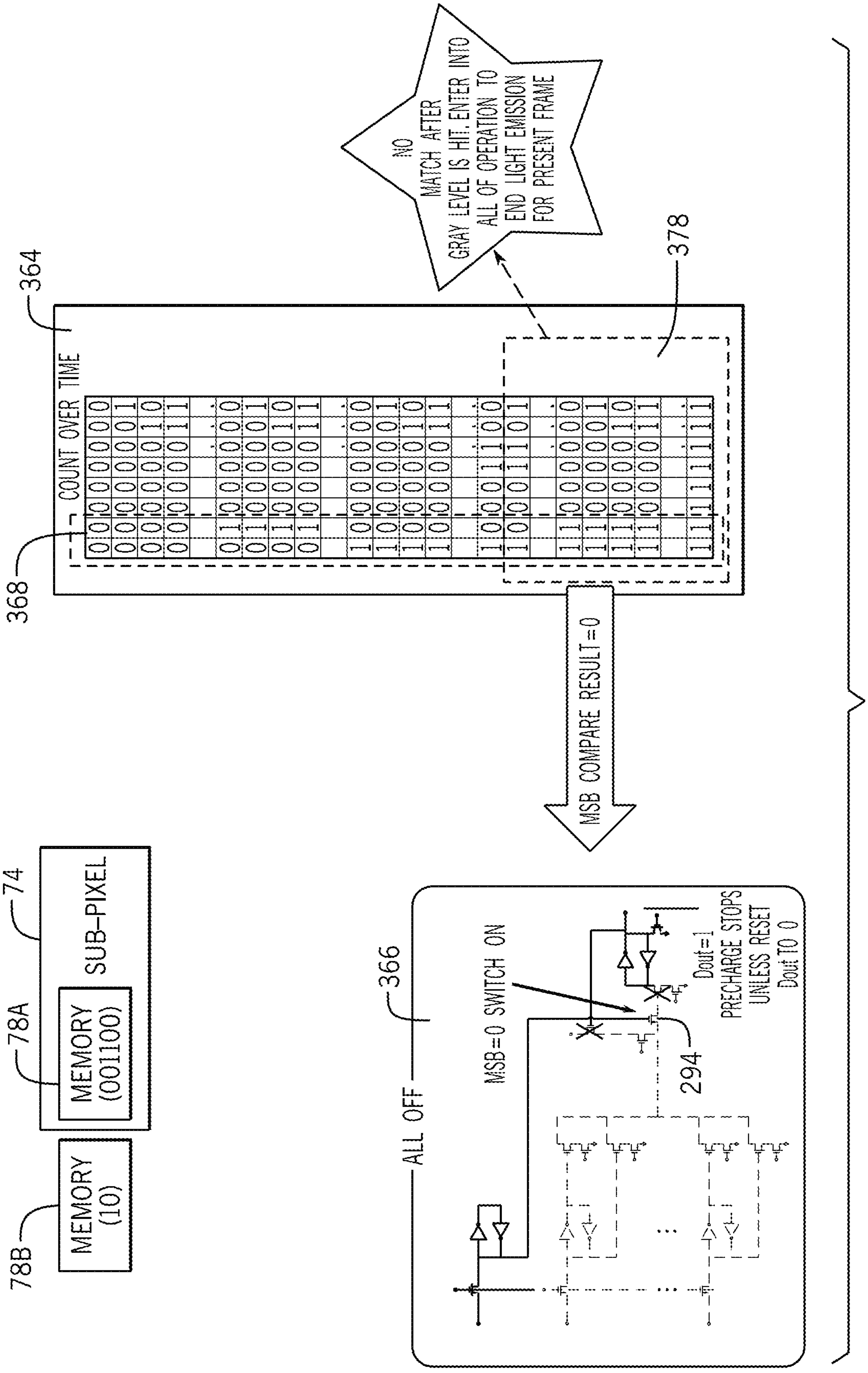
FIG. 21 is an illustration depicting an all off operation of the pixel of FIG. 17, in accordance with an embodiment.

To elaborate further on the dual-control operation discussed with reference to FIG. 19 (e.g., block 346), FIG. 20 is an illustration depicting an all on operation of the sub-pixel 74 (e.g., represented as changing over time as within block 360) and a modulated operation of the sub-pixel 74 (e.g., represented as changing over time as within block 362) in response to a count of the counter 108 (e.g., represented as changing over time as within block 364) and FIG. 21 is an illustration depicting an all off operation of the sub-pixel 74 (e.g., represented as changing over time as within block 366) in response to a count of the counter 108 (e.g., represented as changing over time as within the block 364). For ease of explanation, FIG. 20 and FIG. 21 are described together. The example memory system shown in FIG. 20 and FIG. 21 corresponds to the memory 78 being of total size 8 bits, where the memory 78A stores 6 bits and the memory 78B stores 2 bits. The block 364 shows a representation over time of a count maintained by the counter 108. In this way, the counter 108 may include multiple serially coupled flip-flop or state-holding devices that operate in response to a clock (e.g., gray level clock 110) to transition an output between binary states (e.g., an output representative of a voltage level at nodes between the serially coupled flip-flops or devices).

For this example memory configuration where the memory 78 has a total size of 8 bits, a total range of 256 gray levels may exist. "00000000" may represent a lowest gray level for the 256 gray levels and "11111111" may represent a highest gray level for the 256 gray levels. The sub-pixel 74 may be driven to emit light according to data stored in the memory 78, where the data stored may indicate a target gray level out of the total range of gray levels. For example, the target gray level in this example may correspond to 140 from the 256 total options for gray levels (e.g., 54.7% brightness relative to maximum brightness). The gray level 140 may be represented by binary data "10001100." In this example, the memory 78B stores relatively more significant bits of the target gray level (e.g., binary data "10") and the memory 78A stores the remaining bits (e.g., binary data "001100").

When controlling light emission from the sub-pixel 74, the generally described comparison operation may be split into two operations (e.g., dual-control). The first operation may cause light emission until the more significant bits match, then once the more significant bits match, the second operation may cause light emission until the remaining bits (e.g., less significant bits) match (e.g., to fine tune the gray level). Light emission is caused during the first operation based on a comparison between the bits stored in the memory 78B and the corresponding bits of the count (e.g., bits 368). Each time the count is incremented, in this example, the corresponding bits of the count are compared to the bits stored in the memory 78B. Since there is no way for the image data 56A to equal the count when the first few bits do not match, the sub-pixel 74 may be driven to emit light without concern via the all on operation (e.g., block 360) for whether the remaining bits match while waiting for the count to match the first few bits of the image data 56A.

While driven according to the all on operation (e.g., block 360), the sub-pixel 74 emits light without consideration for data stored in the memory 78A. While the first two bits of the count do not match the data stored in memory 78B, the data 286 equals a logical high value (e.g., "1"), the switch 294 is operated off. Output from the comparator 120 may be stopped from being able to drive the sub-pixel 74 to emit light while the switch 294 is off. The data 286 may change to equaling a logical low value (e.g., "0") once the first two bits of the count match the data stored in memory 78B. A write control signal 291 (write_enX control signal) may be enabled during the all on operation (e.g., block 360), such that the change is captured in the inverter pair 292 relatively soon after the change occurs.

To illustrate this change, subset 370 of represented count states corresponds to when the first two bits of the count do not match the data stored in memory 78B (e.g., "00000000" through "01111111") and subset 372 of represented count states corresponds to when the count matches the data stored in memory 78B (e.g., "10000000" through "10111111"). When the data 286 changes to the logical low value (e.g., "0"), the switch 294 is activated, thereby permitting an output from the comparator 120 (e.g., MTCH) to drive light emission of the sub-pixel 74.

When the data 286 changes to the logical low value (e.g., "0"), the sub-pixel 74 may be driven to emit light according to data stored in the memory 78B via the modulated operation (e.g., block 362), where any remaining bits of the image data 56A are used to fine tune an amount of light emitted by the sub-pixel 74 during the all on operation (e.g., block 360). The sub-pixel 74 may emit light until remaining bits of the count is greater than or equal to the image data 56A. When the count is greater than the image data 56A (e.g., once the last six bits of the count exceed the six bits of image data 56A stored in memory 78A), the output from the comparator 120 may be a logic high level, and thus may stop light emission from the sub-pixel 74 as part of an all off operation (e.g., block 366). This transition between the modulation operation (e.g., block 362) and the all off operation (e.g., block 366) may occur in response to the count changing from count 374 to count 376.

While driven according to the all off operation (e.g., block 366), the sub-pixel 74 may not emit light and/or may be driven to not emit light. The transition into the all off operation (e.g., block 366) may lock the logical high value generated by the comparator 120 into the inverter pair 296 and/or may disable precharge signal 304, thereby disabling the output of the comparator 120 from adjusting the value stored in the inverter pair 296. In this way, new image data 56A may be loaded into the memory 78A after transition into the all operation (e.g., block 366) to prepare for the next frame without interrupting a presentation of the ongoing frame. The all off operation (e.g., block 366) may continue while the count finishes transitioning through remaining states corresponding to subset 378 of count states (e.g., "10001101" through "11111111"). The sub-pixel 74 may not be driven to emit light again until the inverter pair 296 is reset and storing a logical low value (e.g., "0"). In this way, the timing controller 54 may transmit the reset signal 300 (e.g., from FIG. 17) when ready to begin presentation of a subsequent frame. It is noted that since the inverter pair 292 is operated to store a compare result in response to write control signal 291, the value stored in the inverter pair 292 may not change during the all off operation (e.g., block 366) since the write control signal 291 is not transmitted during the all off operation (e.g., block 366). It is noted that although the term "all" is used to describe "all on operation" or "all off operation," it should be understand that these operations may apply to one sub-pixel 74, one pixel 72, a region of pixel array 70, a region of sub-pixels 74, an entire display 18, or any combination thereof.

Using dual-control (e.g., memory 78A and memory 78B) to drive the sub-pixel 74 may help reduce power consumed by the driving circuitry (e.g., inverter pairs 290, comparator 120) by reducing an amount of time that the driving circuitry is driving the sub-pixel 74 to emit light since the driving circuitry may be decoupled from power supplies when not driving the sub-pixel 74. Dual-control driving may additionally or alternatively improve driving flexibility of the display 18 by increasing a number of options for loading image data and/or driving the sub-pixel 74 to emit light. Furthermore, dual-control driving of the sub-pixel 74 may enable single pulse width modulation driving techniques to be used with pixels that include memory.

Figure 22:
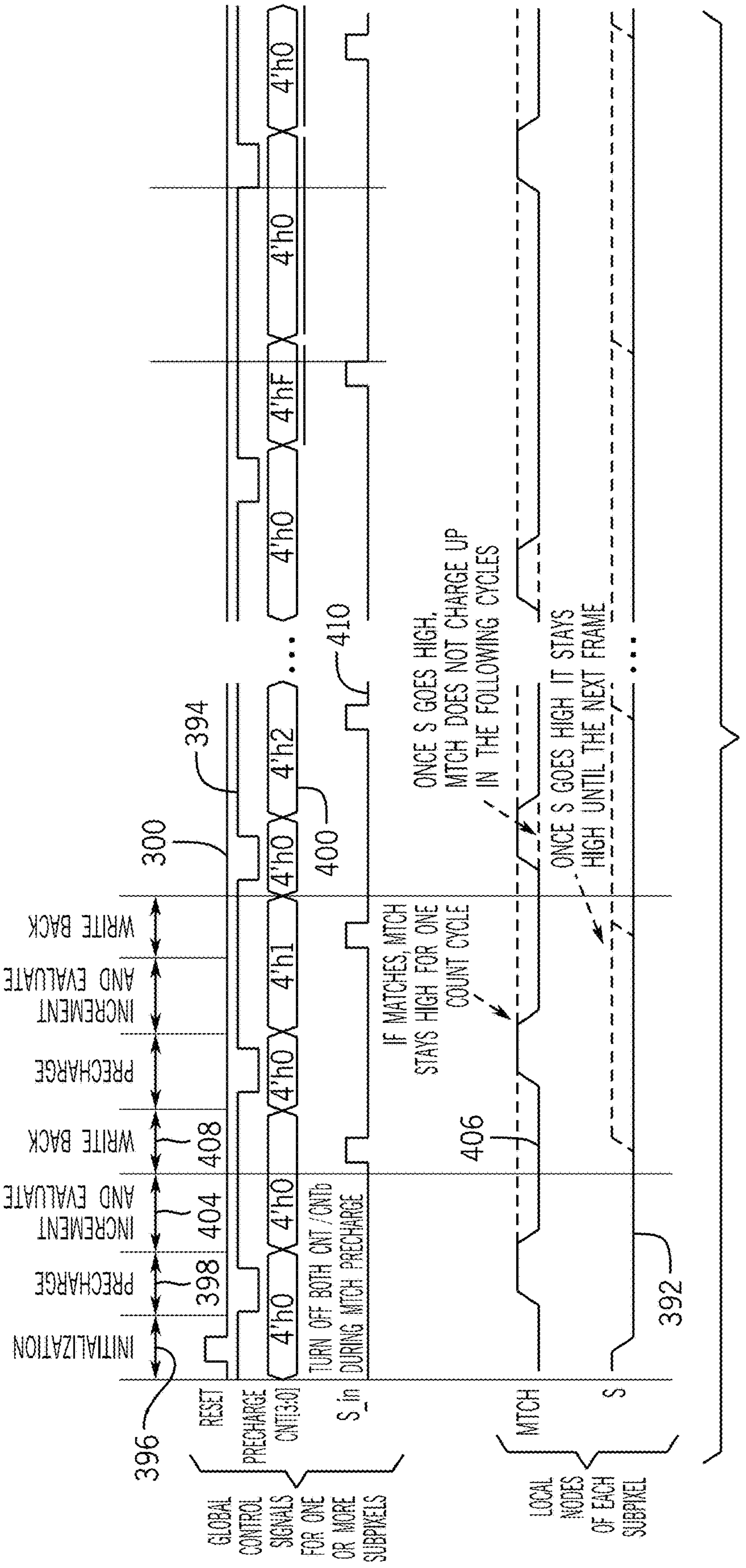
FIG. 22 is a timing diagram of signals associated with operating the pixel of FIG. 17 according to the process of FIG. 19, in accordance with an embodiment.

FIG. 22 is a timing diagram of an example operation of the sub-pixel 74 according to various operations of process 340. For example, the timing controller 54 may drive the sub-pixel 74 according to initialize operations (e.g., block 342), precharge operations (e.g., block 344), increment and evaluate operations (e.g., block 346), write back operations, and ultimately, after performing one or more interactions of precharge operations, write operations, and/or increment and evaluate operations, prepare operations to prepare for a next frame (e.g., block 350). Various combinations of control signals generated in response to instructions from the timing controller 54 may be illustrated in FIG. 22 and described herein.

For example, to initialize the sub-pixel 74, the timing controller 54 may cause activation of the reset signal 300. The initialization may cause a value stored by the inverter pair 296 (e.g., signal 392) to reset to a logical low value (e.g., "0"). The activation of the reset signal 300 may correspond to a resetting of the clock used to transition the count maintained by the counter 108 (e.g., signal 394) and received at switches 298 of the comparator 120. The signal 394 may be of a logical high value sufficiently after an initialization period 396 and a precharge period 398 to cause the first instance of change in count (e.g., from 0 to 1) to occur once the sub-pixel 74 is ready to continue emission.

To precharge the sub-pixel 74, the timing controller 54 may toggle the precharge signal 304 (e.g., signal 400). The image data 56A may be loaded into some or both memory 78 (e.g., memory 78A, memory 78B) during the initialization period 396.

During an increment and evaluation period 404, the precharge signal 304 may toggle to a state opposite of what it was during a portion of the precharge period 398. The count may increment in response to a state of the clock (e.g., signal 394), where the "4'h0" labeled portions of the signal 394 correspond to a duration of time between changes in count, such as a duration of time to drive the counter 108 to update its count. "4'hn . . . 4'h1 . . . 4'hF" labeled portions of the signal 394 may correspond to a duration of time associated with the count of the counter 108 is reading the indicated number of "4'hb," "4'h1," or so on.

A match between the count and the image data 56A stored in the memory 78 may be automatically evaluated. If the count matches the image data 56A stored in memory 78B, a value of the output from the comparator 120 may change (e.g., represented by toggling of a signal 406). It is noted that the signal 406 may be briefly driven high during the precharge period 398 to reset the value of the output from the comparator 120 and thus precharge the node coupling the comparator 120 to the switch 294, and the evaluation may be performed after the precharge period 398 (and any subsequent precharge periods). The output of the comparator 120 may be precharged one or more times for each frame to enable a relatively lower change in voltage cause the change in state of the switch 294, thereby causing a temporary toggling of the signal 406 during the precharge period 398.

Once the signal 406 goes high during the precharge period 398, a subsequent high level of the signal 406 during the increment and evaluation period 404 may cause the output from the inverter pair 296 to go high during a write back period 408. The switch 307 may be controlled in response to a logical high level of a control signal (e.g., signal 410). During the write back period 408, the switch 307 may activate in response to toggling of the signal 410 to the logical high level, thereby causing the output from the comparator 120 to be stored in the inverter pair 296 as the signal 392. Light emission from the sub-pixel 74 stops in response to the signal 392 going high. The signal 392 may remain high until a subsequent initialization period 396 corresponding to a subsequent frame, and thus until the next frame. Furthermore, once the signal 392 goes high, and remains high, the signal 406 may stop charging up to the high level, and thus may remain at a logical low value until the subsequent initialization period 396. In this way, it may be said that the signal 406 (e.g., output from the comparator 120) and the signal 392 (e.g., output from the inverter pair 296) may be reset at a substantially similar time during initialization periods 396 and/or in response to the reset signal 300.

Keeping the foregoing in mind, the timing controller 54 may reload data for each sub-pixel 74 between sub-frames. This may mean that sometimes the data stored in the memory 78A changes between sub-frames, such that the memory 78A may be loaded independent of loading operations for the memory 78B. For example, data stored in the memory 78A during a first sub-frame for a first frame may correspond to a previous frame until the timing controller 54 updates data stored in memory 78A for a present frame. This may improve driving operations by improving a capability of the display 18 for parallel driving and/or parallel image frame processing operations (e.g., enabling the loading of one image frame while completing presentation of a second image frame). Consider the case where a first image frame is to be presented before a second image frame. The first image frame may be displayed over a set of four sub-frame driving periods and the second image frame may be displayed over a set of four sub-frame driving periods. The timing controller 54 may drive the sub-pixel 74 to emit light from the memory 78A for last sub-frame corresponding to presentation of the first image frame while loading data into the memory 78B for presentation of a first sub-frame corresponding to presentation of the second image frame.

Furthermore, in some cases, data may be stored in the memory 78A during a similar loading operation as the memory 78B, such that the memory 78A is preloaded before the emission operation according to the memory 78A (e.g., modulation operation 362). When driving the display 18 using separate loading sequences for the memory 78A and the memory 78B, the loading of each portion of the memory 78 may occur when relatively optimal for the display 18, such as when a refresh is to already occur, which may improve efficiencies of the display 18.

As has been discussed throughout this disclosure, it should be understood that memory-in-pixel techniques are valid for a variety of embodiments and display technologies. It should also be understood that for each reference voltage discussed, or disclosed in the figures, additional or alternative reference voltages may be used. Additionally or alternatively, it is noted that although described as reducing or eliminating a reliance on using a frame buffer, memory-in-pixel techniques may be used in tandem with a frame buffer in some embodiments. Furthermore, although memory circuitry has been described as storing 6 bits and/or 8 bits, it should be appreciated that any suitable memory structure may be used to store any suitable number of bits, such as 12 bits or 16 bits. It is also noted that any of the described systems or methods may be used in combination with one another. For example, a memory shared between sub-pixels may benefit from driving methods that also use external allocated memory to the sub-pixels when driving the respective sub-pixels to emit light.

Accordingly, technical effects of the present disclosure include techniques for implementing memory in one or more pixels of a display to improve processing techniques of image data for presentation, for example, by using a relatively higher bit depth to represent a target gray level than what is able to be stored by individual memories storing data corresponding to the target gray level. The techniques include systems and methods for receiving image data, storing the image data in memory allocated for the pixel (e.g., in memory internal to the pixel and allocated external memory), and transmitting the image data to a driver circuit to operate a light-emitting element of a pixel to emit light. By driving a pixel according to image data stored in memory allocated to the pixel, driving operations may improve, for example, by increasing flexibility of options to be used to load or store image data for the pixel and/or by increasing a bit depth able to be used to load or store image data beyond capabilities provided by the memory-in-pixel (e.g., memory internal to the pixel). For example, storing image data in memory internal to the pixel may be loaded at a different time than image data to be loaded in external memory allocated to the pixel. Furthermore, using dual-control driving of the sub-pixel may help reduce power consumed by driving circuitry of the sub-pixel and/or the sub-pixel by reducing an amount of time that circuitry (e.g., driving circuitry) of the sub-pixel is transmitted electrical signals to drive the sub-pixel 74. A duration of time electrical signals are transmitted using circuitry of the sub-pixel may reduce in time and/or reduce in a number of components consuming power since some circuitry of the sub-pixel may be decoupled from power supplies when not being used to drive the sub-pixel 74. Furthermore, dual-control of the sub-pixel 74 enables single pulse width modulation driving techniques to be used with pixels that include memory.

The techniques described herein may be applied and integrated with a variety of display technologies and should not be limited to the specific embodiments depicted and/or described herein. For example, pixels with memory are shown as having a light-emitting diode as a light-modulating device, however, the memory-in-pixels techniques may be generally applied to different pixel circuitry to support a variety of display technologies that use a variety of light-modulating devices. In this way, suitable pixel circuitry supporting light emission via a light-emitting diode, a digital mirror display, an organic light-emitting diode, or circuitry supporting a liquid crystal display, a plasma display, or a dot-matrix display may each have memory in the pixel to achieve at least improvements to data transmission bandwidths and ease of programming the pixels.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

What is claimed is:

1. A device, comprising:
- a pixel disposed in a region of a display;
- a first memory disposed outside the region;
- a second memory disposed in the region and comprising a plurality of memory circuitry;
- processing circuitry configured to store, for a portion of image data corresponding to cause the pixel to emit light at a grey level, a first bit in the first memory and one or more bits in the second memory; and
- a switch disposed between the first memory and the second memory, wherein the switch is operable based on the first bit in the first memory, and wherein the pixel emits light based on the one or more bits in the second memory while the switch is on.

2. The device of claim 1, wherein the processing circuitry is configured to:
- receive the portion of image data;
- generate, based on the first bit stored in the first memory, a first control signal to perform an all-on light emission operation; and
- generate, based on the one or more bits stored in the second memory, a second control signal to perform a modulated light emission operation.

3. The device of claim 2, wherein the device comprises a comparator, wherein the processing circuitry is configured to cause generation of the first control signal, the second control signal, or both based on the comparator comparing the first bit to a count of a counter.

4. The device of claim 2, wherein the processing circuitry is configured to generate the first control signal to perform the modulated light emission operation after the all-on light emission operation in response to the one or more bits being stored in the second memory.

5. The device of claim 1, wherein the processing circuitry is configured to:
- encode the portion of image data;
- associate respective bits of the encoded portion of image data into respective sub-frames; and
- operate the pixel to emit light according to the encoded portion of image data at least in part by:
  - identifying a first subset of the respective sub-frames that each only comprise bits having a first state;
  - identifying a second subset of the respective sub-frames that each only comprise bits having a second state;
  - identifying the remaining respective sub-frames as a third subset of the respective sub-frames, wherein each sub-frame of the third subset of respective sub-frames comprises bits having either the first state or the second state;
  - for a first duration of time corresponding to the first subset of the respective sub-frames, operating the switch off; and
  - for a second duration of time corresponding to the third subset of the respective sub-frames, operating the switch on.

6. The device of claim 5, wherein the processing circuitry operating the switch off corresponds to an all-on light emission operation, and wherein the processing circuitry operating the switch on corresponds to a modulated light emission operation.

7. The device of claim 1, wherein the processing circuitry is configured to operate the switch off based on storing a bit having a first state in the first memory.

8. The device of claim 1, wherein the first memory comprises one or more inverter pairs disposed in the region, wherein the region corresponds to an active area of the display.

9. A method, comprising:
- receiving a portion of image data associated with an image frame to be presented, wherein a pixel respectively emits light based on the portion of image data;
- determining to perform an all-on light emission operation configured to cause the pixel to emit light based on a first bit associated with the portion of image data;
- generating a first control signal based on the determination to perform the all-on light emission operation, wherein the first control signal causes the pixel to emit light;
- determining to perform a modulated light emission operation after the all-on light emission operation; and
- generating a second control signal based on the determination to perform the modulated light emission operation, wherein the second control signal is configured to cause the pixel to emit light based on one or more bits associated with the portion of image data.

10. The method of claim 9, comprising:
- encoding the portion of image data; and operating the pixel to emit light according to the encoded portion of image data, wherein the first bit and the one or more bits are generated based on the encoded portion of image data.

11. The method of claim 10, wherein operating the pixel to emit light according to the encoded portion of image data comprises:

associating respective bits of the encoded portion of image data into respective sub-frames;

identifying a first subset of the respective sub-frames that each only comprise bits having a first state;

identifying a second subset of the respective sub-frames that each only comprise bits having a second state;

identifying the remaining respective sub-frames as a third subset of the respective sub-frames, wherein each sub-frame of the third subset of respective sub-frames respectively comprises bits having either the first state or the second state;

for a first duration of time corresponding to the first subset of the respective sub-frames, operating a switch off; and for a second duration of time corresponding to the third subset of the respective sub-frames, operating the switch on.

12. The method of claim 11, comprising after the first duration of time passes, performing the modulated light emission operation for a third duration of time corresponding to the one or more bits, wherein the third duration of time is less than the second duration of time.

13. The method of claim 9, comprising receiving, as the portion of image data, a plurality of bits, wherein the plurality of bits comprises a first bit as a most significant bit before one or more bits.

14. The method of claim 9, comprising:

storing the first bit in a first memory disposed outside the pixel, wherein the first bit is generated based on a comparison of the portion of image data to a count; and storing the one or more bits in a second memory disposed in the pixel.

15. A tangible, non-transitory, computer-readable medium, comprising computer-readable instructions that, when executed by one or more processors of one or more computers, cause the one or more computers to:

receive a portion of image data associated with an image frame to be presented via a pixel of an active area, wherein the portion of image data corresponds to a first bit and one or more bits;

generate a first control signal based on the first bit that causes the pixel to perform an all-on light emission operation; and generate a second control signal based on the one or more bits that causes the pixel to perform a modulated light emission operation.

16. The tangible, non-transitory, computer-readable medium of claim 15, comprising computer-readable instructions that, when executed by one or more processors of one or more computers, cause the one or more computers to:

store the one or more bits in a second memory disposed inside the active area; and store the first bit in a first memory disposed outside the active area.

17. The tangible, non-transitory, computer-readable medium of claim 16, comprising computer-readable instructions that, when executed by one or more processors of one or more computers, cause the one or more computers to generate the first bit based on a comparison between a count and between remaining bits of the portion of image data not in the one or more bits stored in the second memory.

18. The tangible, non-transitory, computer-readable medium of claim 16, comprising computer-readable instructions that, when executed by one or more processors of one or more computers, cause the one or more computers to:

generate the first control signal to perform the all-on light emission operation based on the first memory storing the first bit;

store a second bit in the first memory based on stopping the all-on light emission operation; and generate the second control signal to perform the modulated light emission operation based on the second bit and the second memory storing the one or more bits.

19. The tangible, non-transitory, computer-readable medium of claim 18, wherein the first bit causes a maximum light emission from the pixel, and wherein the second bit causes the pixel to emit light according to the one or more bits.

20. The device of claim 1, wherein the processing circuitry is configured to:

receive the portion of image data;

generate, based on the first bit stored in the first memory, a first control signal to perform a first light emission operation; and generate, based on the one or more bits stored in the second memory, a second control signal to perform a second light emission operation.

* * * * *